(12) United States Patent
Sato

(10) Patent No.: US 9,635,326 B2
(45) Date of Patent: Apr. 25, 2017

(54) DISCHARGE LAMP DRIVING DEVICE, PROJECTOR, AND DISCHARGE LAMP DRIVING METHOD

(71) Applicant: SEIKO EPSON CORPORATION, Tokyo (JP)

(72) Inventor: Shun Sato, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 15/057,409

(22) Filed: Mar. 1, 2016

(65) Prior Publication Data

US 2016/0270196 A1 Sep. 15, 2016

(30) Foreign Application Priority Data

Mar. 9, 2015 (JP) ................... 2015-045580

(51) Int. Cl.
*H05B 41/282* (2006.01)
*H05B 41/36* (2006.01)
*G03B 21/20* (2006.01)
*H04N 9/31* (2006.01)
*H05B 41/38* (2006.01)

(52) U.S. Cl.
CPC ......... *H04N 9/3155* (2013.01); *G03B 21/206* (2013.01); *H05B 41/38* (2013.01); *Y02B 20/183* (2013.01)

(58) Field of Classification Search
CPC ............ H05B 41/2883; H05B 41/3928; H05B 41/2928; H05B 41/36; H05B 41/38; G03B 21/2026; G03B 21/206; G03B 21/005; G03B 21/2053; H04N 9/3155

USPC .... 315/209 R, 224, 246, 287, 291, 307, 308
See application file for complete search history.

(56) References Cited

U.S. PATENT DOCUMENTS 7,023,144 B2 * 4/2006 Suzuki .................... H01J 61/20
315/246
7,391,165 B2 6/2008 Lee et al.
(Continued)

FOREIGN PATENT DOCUMENTS

JP 2006059790 A 3/2006
JP 5278212 B2 9/2013

OTHER PUBLICATIONS

Apr. 19, 2016 extended Search Report issued in European Patent Application No. 16158724.1.
(Continued)

*Primary Examiner* — Thai Pham
(74) *Attorney, Agent, or Firm* — Oliff PLC

(57) ABSTRACT

In an aspect of a discharge lamp driving device, a control unit performs first discharge lamp driving in which a first control and a second control are performed, and a second discharge lamp driving in which a third control and a fourth control are performed, a ratio of a DC current in the second control is higher than a ratio of the DC current in the first control, a ratio of the DC current in the fourth control is higher than a ratio of the DC current in the third control and is higher than the ratio of the DC current in the second control, and the control unit performs a transition from the second discharge lamp driving to the first discharge lamp driving in a case where an inter-electrode voltage is lower than a first reverse transition voltage.

20 Claims, 13 Drawing Sheets

(56) References Cited

U.S. PATENT DOCUMENTS

| | | | |
|---|---|---|---|
| 8,237,378 B2* | 8/2012 | Terashima | H05B 41/2928 315/200 R |
| 8,269,424 B2* | 9/2012 | Terashima | H05B 41/2883 315/246 |
| 8,853,961 B2* | 10/2014 | Terashima | H05B 41/2928 315/246 |
| 9,152,027 B2* | 10/2015 | Terashima | G03B 21/2026 |
| 2003/0080693 A1 | 5/2003 | Ono et al. | |
| 2005/0206326 A1 | 9/2005 | Suzuki et al. | |
| 2008/0024853 A1 | 1/2008 | Tanaka et al. | |
| 2008/0198337 A1 | 8/2008 | Kitagawa | |
| 2009/0237625 A1* | 9/2009 | Yamauchi | H05B 41/2928 353/85 |
| 2010/0109542 A1 | 5/2010 | Komatsu et al. | |
| 2010/0127631 A1 | 5/2010 | Okamoto et al. | |
| 2011/0012524 A1 | 1/2011 | Terashima | |
| 2011/0063584 A1 | 3/2011 | Hirao et al. | |
| 2012/0074858 A1 | 3/2012 | Ono et al. | |
| 2013/0038844 A1 | 2/2013 | Suzuki et al. | |
| 2014/0063471 A1 | 3/2014 | Suzuki et al. | |
| 2014/0168391 A1 | 6/2014 | Terashima et al. | |

OTHER PUBLICATIONS

Apr. 12, 2016 Search Report issued in European Patent Application No. 16 15 8722.
Jan. 27, 2017 Office Action Issued in U.S Appl. No. 15/059,892.

* cited by examiner

DISCHARGE LAMP DRIVING DEVICE, PROJECTOR, AND DISCHARGE LAMP DRIVING METHOD

BACKGROUND

1. Technical Field

The present invention relates to a discharge lamp driving device, a light source device, a projector, and a discharge lamp driving method.

2. Related Art

For example, in JP-A-2006-59790, a discharge lamp lighting device in which protrusions are formed at electrode tip ends of a discharge lamp by supplying an AC current having a steady lighting frequency and an AC current having a frequency lower than the steady lighting frequency to the discharge lamp is described.

However, it becomes difficult to form the protrusions of the electrode tip ends of the discharge lamp when the protrusions become deteriorated. Therefore, in a method of driving the discharge lamp as described above, it is difficult to maintain a stable electrode shape in a case where the discharge lamp is deteriorated. Accordingly, there is concern that the service life of the discharge lamp may not be sufficiently enhanced.

SUMMARY

An advantage of some aspects of the invention is that it provides a discharge lamp driving device capable of enhancing the service life of a discharge lamp, a light source device including the discharge lamp driving device, and a projector including the light source device. Another advantage of some aspects of the invention is that it provides a discharge lamp driving method capable of enhancing the service life of a discharge lamp.

An aspect of the invention is directed to a discharge lamp driving device including: a discharge lamp driving unit configured to supply a drive current to a discharge lamp; a control unit configured to control the discharge lamp driving unit; and a voltage detection unit configured to detect an inter-electrode voltage of the discharge lamp, in which the control unit performs a first discharge lamp driving in which a first control and a second control for supplying the drive current including a DC current and an AC current to the discharge lamp are performed, and a second discharge lamp driving in which a third control and a fourth control for supplying the drive current including the DC current and the AC current to the discharge lamp are performed, in the first discharge lamp driving, the control unit performs the first control in a case where the inter-electrode voltage is equal to or lower than a first threshold voltage at a predetermined set timing, and performs the second control in a case where the inter-electrode voltage is higher than the first threshold voltage at the predetermined set timing, in the second discharge lamp driving, the control unit performs the third control in a case where the inter-electrode voltage is equal to or lower than a second threshold voltage that is higher than the first threshold voltage at a predetermined set timing, and performs the fourth control in a case where the inter-electrode voltage is higher than the second threshold voltage at the predetermined set timing, a ratio of the DC current in the second control is higher than a ratio of the DC current in the first control, a ratio of the DC current in the fourth control is higher than a ratio of the DC current in the third control and is higher than the ratio of the DC current in the second control, and in the second discharge lamp driving, the control unit performs a transition from the second discharge lamp driving to the first discharge lamp driving in a case where the inter-electrode voltage is lower than a first reverse transition voltage that is lower than the second threshold voltage.

In the discharge lamp driving device according to the aspect of the invention, the first control and the second control are appropriately performed depending on the inter-electrode voltage during the first discharge lamp driving. The ratio of the DC current during the second control is higher than the ratio of the DC current during the first control. Therefore, in a case where a protrusion of the electrode tip end of the discharge lamp wears down and the inter-electrode voltage becomes higher than the first threshold voltage by the first control, switching to the second control in which the ratio of the DC current is higher than that during the first control is performed, and thus the protrusion can be grown.

Here, for example, when the discharge lamp driving unit is continuously controlled under the second control after the switching to the second control, the electrode is melted, and as a result, the protrusion is formed. However, the electrode body on which the protrusion is formed wears down and a stable electrode shape cannot be maintained.

Contrary to this, in the discharge lamp driving device according to the aspect of the invention, in a case where the protrusion is grown after the switching to the second control and the inter-electrode voltage becomes equal to or lower than the first threshold voltage, the control method of the discharge lamp driving unit is switched to the first control again. Accordingly, wear of the electrode body can be suppressed. In addition, the inter-electrode voltage can be maintained in a constant range with respect to the first threshold voltage.

As described above, in the discharge lamp driving device according to the aspect of the invention, by appropriately switching between the first control and the second control, a stable electrode shape can be maintained while maintaining the inter-electrode voltage in a constant range. As a result, the service life of the discharge lamp can be enhanced.

In addition, for example, there may be cases where the protrusion of the electrode is grown and thinly extends during the second discharge lamp driving. In this case, when a drive current having a high thermal load is supplied to the discharge lamp, the protrusion rapidly wears down, and there may be cases where the service life of the discharge lamp cannot be sufficiently enhanced.

Contrary to this, in the discharge lamp driving device according to the aspect of the invention, the control unit transitions the driving of the discharge lamp from the second discharge lamp driving to the first discharge lamp driving in a case where the inter-electrode voltage is lower than the first reverse transition voltage that is lower than the second threshold voltage during the second discharge lamp driving. The ratio of the DC current during the second control of the first discharge lamp driving is lower than the ratio of the DC current during the fourth control of the second discharge lamp driving. That is, in a case where the electrode is grown and the inter-electrode voltage is decreased during the second discharge lamp driving, the driving of the discharge lamp is transitioned to the first discharge lamp driving in which a thermal load applied to the electrode is lower than that during the second discharge lamp driving. Therefore, the protrusion which is grown during the second discharge lamp driving can be prevented from rapidly wearing down. As a result, the service life of the discharge lamp can be further enhanced.

The first reverse transition voltage may be lower than the first threshold voltage.

In this configuration, a timing at which a transition from the second discharge lamp driving to the first discharge lamp driving is performed can be appropriately set.

The ratio of the DC current in the third control may be substantially equal to the ratio of the DC current in the first control.

In this configuration, the difference in the thermal load between the third control and the fourth control can be greater than the difference in the thermal load between the first control and the second control. Therefore, the protrusion of the electrode can be more easily grown during the fourth control of the second discharge lamp driving.

In the second control of the first discharge lamp driving, in a case where the inter-electrode voltage is higher than a first transition voltage that is equal to or higher than the first threshold voltage and a continuous execution time of the second control is equal to or longer than a first transition time, the control unit may perform a transition from the first discharge lamp driving to the second discharge lamp driving.

For example, in a case where only the first discharge lamp driving is performed for a long period of time, there may be cases where the inter-electrode voltage of the discharge lamp is not decreased. In this configuration, in the case where the inter-electrode voltage of the discharge lamp is not decreased during the first discharge lamp driving, the driving of the discharge lamp can be transitioned to the second discharge lamp driving. Accordingly, the service life of the discharge lamp can be further enhanced.

The first transition voltage may be higher than the first threshold voltage.

In this configuration, the driving of the discharge lamp can be appropriately transitioned from the first discharge lamp driving to the second discharge lamp driving.

The first transition voltage may be lower than the second threshold voltage.

In this configuration, the driving of the discharge lamp can be appropriately transitioned from the first discharge lamp driving to the second discharge lamp driving before the discharge lamp is excessively deteriorated.

The control unit may perform a third discharge lamp driving in which a fifth control and a sixth control for supplying the drive current including the DC current and the AC current to the discharge lamp are performed, in the third discharge lamp driving, the control unit may perform the fifth control in a case where the inter-electrode voltage is equal to or lower than a third threshold voltage that is higher than the second threshold voltage at a predetermined set timing, and performs the sixth control in a case where the inter-electrode voltage is higher than the third threshold voltage at the predetermined set timing, a ratio of the DC current in the sixth control may be higher than a ratio of the DC current in the fifth control and is higher than the ratio of the DC current in the fourth control, and in the fourth control of the second discharge lamp driving, in a case where the inter-electrode voltage is higher than a second transition voltage that is equal to or higher than the third threshold voltage and a continuous execution time of the fourth control is equal to or longer than a second transition time, the control unit may perform a transition from the second discharge lamp driving to the third discharge lamp driving.

In this configuration, the service life of the discharge lamp can be further enhanced.

In the third discharge lamp driving, in a case where the inter-electrode voltage is lower than a second reverse transition voltage that is lower than the third threshold voltage and is equal to or higher than the first reverse transition voltage, the control unit may perform a transition of the driving of the discharge lamp from the third discharge lamp driving to the second discharge lamp driving, and during the third discharge lamp driving, in a case where the inter-electrode voltage is lower than the first reverse transition voltage, the control unit may perform a transition of the driving of the discharge lamp from the third discharge lamp driving to the first discharge lamp driving.

In this configuration, the discharge lamp driving can be more appropriately performed, and thus the service life of the discharge lamp can be further enhanced.

Another aspect of the invention is directed to a light source device including: a discharge lamp configured to emit light; and the discharge lamp driving device described above.

In the light source device according to the aspect of the invention, since the discharge lamp driving device is provided, the service life of the discharge lamp can be enhanced.

Still another aspect of the invention is directed to a projector including: the light source device described above; a light modulation element configured to modulate light emitted from the light source device according to a video signal; and a projection optical system configured to project the light modulated by the light modulation element.

In the projector according to the aspect of the invention, since the light source device is provided, the service life of the discharge lamp can be enhanced.

Yet another aspect of the invention is directed to a discharge lamp driving method for driving a discharge lamp to supply a drive current to the discharge lamp, the method including: performing a first discharge lamp driving in which a first control and a second control for supplying the drive current including a DC current and an AC current to the discharge lamp are performed; and performing a second discharge lamp driving in which a third control and a fourth control for supplying the drive current including the DC current and the AC current to the discharge lamp are performed, wherein, in the first discharge lamp driving, in a case where an inter-electrode voltage of the discharge lamp is equal to or lower than a first threshold voltage at a predetermined set timing, the first control is performed, and in a case where the inter-electrode voltage is higher than the first threshold voltage at the predetermined set timing, the second control is performed, in the second discharge lamp driving, in a case where the inter-electrode voltage is equal to or lower than a second threshold voltage that is higher than the first threshold voltage at a predetermined set timing, the third control is performed, and in a case where the inter-electrode voltage is higher than the second threshold voltage at the predetermined set timing, the fourth control is performed, a ratio of the DC current in the second control is higher than a ratio of the DC current in the first control, a ratio of the DC current in the fourth control is higher than a ratio of the DC current in the third control and is higher than the ratio of the DC current in the second control, and in the second discharge lamp driving, in a case where the inter-electrode voltage is lower than a first reverse transition voltage that is lower than the second threshold voltage, a transition from the second discharge lamp driving to the first discharge lamp driving is performed.

In the discharge lamp driving method according to the aspect of the invention, as described above, the service life of the discharge lamp can be enhanced.

BRIEF DESCRIPTION OF THE DRAWINGS

The invention will be described with reference to the accompanying drawings, wherein like numbers reference like elements.

FIG. 12 is a flowchart illustrating an example of a method of selecting discharge lamp driving when the discharge lamp of the embodiment is turned on.

DESCRIPTION OF EXEMPLARY EMBODIMENTS

Figure 1:
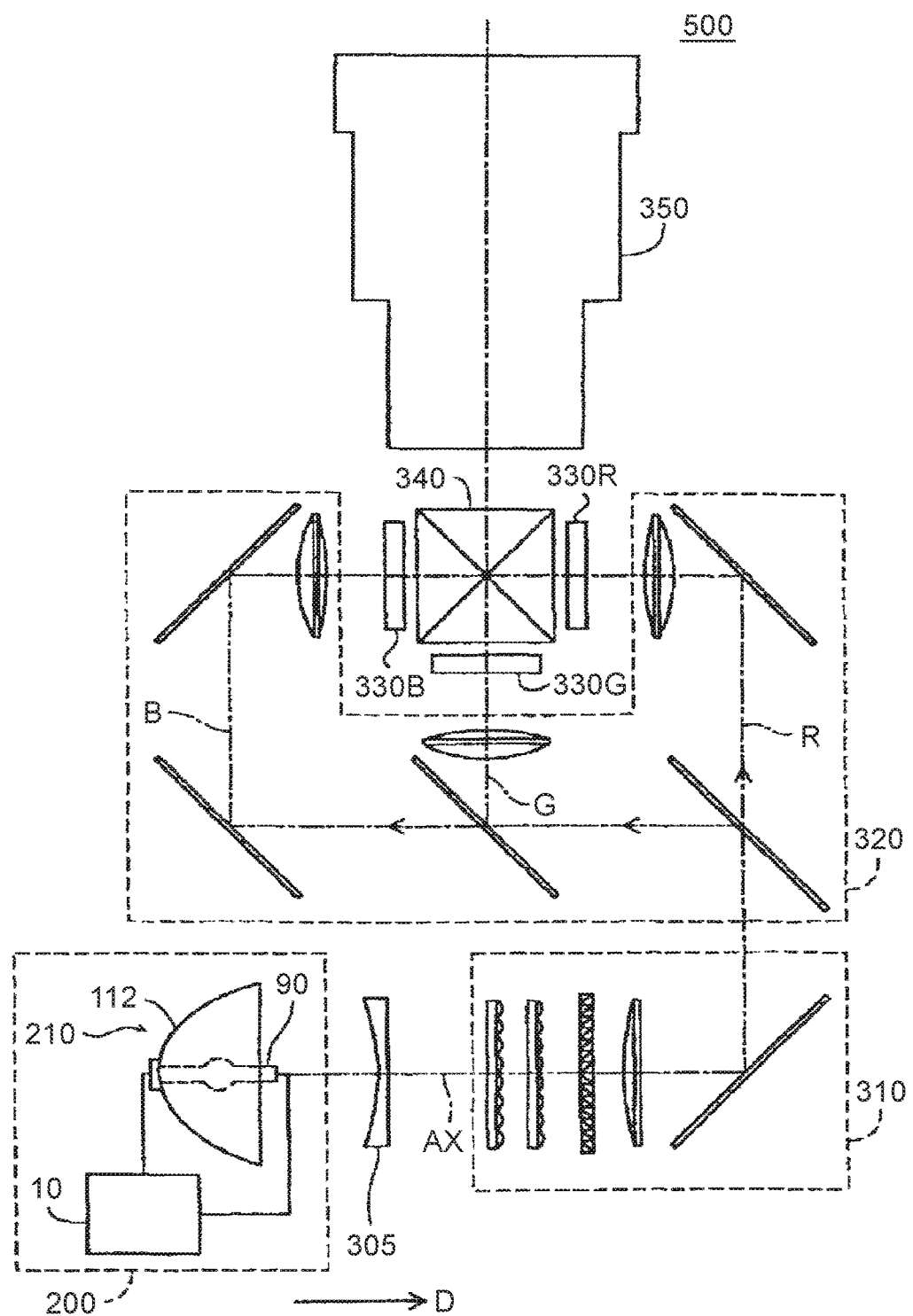
FIG. 1 is a schematic view of the configuration of a projector of an embodiment.

Hereinafter, a projector according to an embodiment of the invention will be described with reference to the drawings.

The scope of the invention is not limited to the following embodiments, and can be arbitrarily changed without departing from the technical spirit of the invention. In the drawings described below, for easy understanding of each configuration, there may be cases where the scales and numbers in each structure are different from those of actual structures.

As illustrated in FIG. 1, a projector 500 of this embodiment includes a light source device 200, a collimating lens 305, an illumination optical system 310, a color separation optical system 320, three liquid crystal light valves (light modulation elements) 330R, 330G, and 330B, a cross dichroic prism 340, and a projection optical system 350.

Light emitted from the light source device 200 passes through the collimating lens 305 and is incident onto the illumination optical system 310. The collimating lens 305 collimates the light from the light source device 200.

The illumination optical system 310 adjusts the illuminance of the light emitted from the light source device 200 to be uniformized on the liquid crystal light valves 330R, 330G, and 330B. Furthermore, the illumination optical system 310 aligns the polarization direction of the light emitted from the light source device 200 in one direction. The reason is to effectively use the light emitted from the light source device 200 in the liquid crystal light valves 330R, 330G, and 330B.

Light of which the illuminance distribution and the polarization direction are adjusted is incident onto the color separation optical system 320. The color separation optical system 320 separates the incident light into three color beams including red light (R), green light (G), and blue light (B). The three color beams are modulated by the liquid crystal light valves 330R, 330G, and 330B which correspond to the respective color beams according to a video signal. The liquid crystal light valves 330R, 330G, and 330B include liquid crystal panels 560R, 560G, and 560B, which will be described later, and polarizing plates (not illustrated). The polarizing plates are disposed on the light incidence side and the light exit side of each of the liquid crystal panels 560R, 560G, and 560B.

The three color beams which are modulated are synthesized by the cross dichroic prism 340. The synthesized light is incident onto the projection optical system 350. The projection optical system 350 projects the incident light onto a screen 700 (see FIG. 3). Accordingly, a video is displayed on the screen 700. As each of the configurations of the collimating lens 305, the illumination optical system 310, the color separation optical system 320, the cross dichroic prism 340, and the projection optical system 350, a well-known configuration may be employed.

Figure 2:
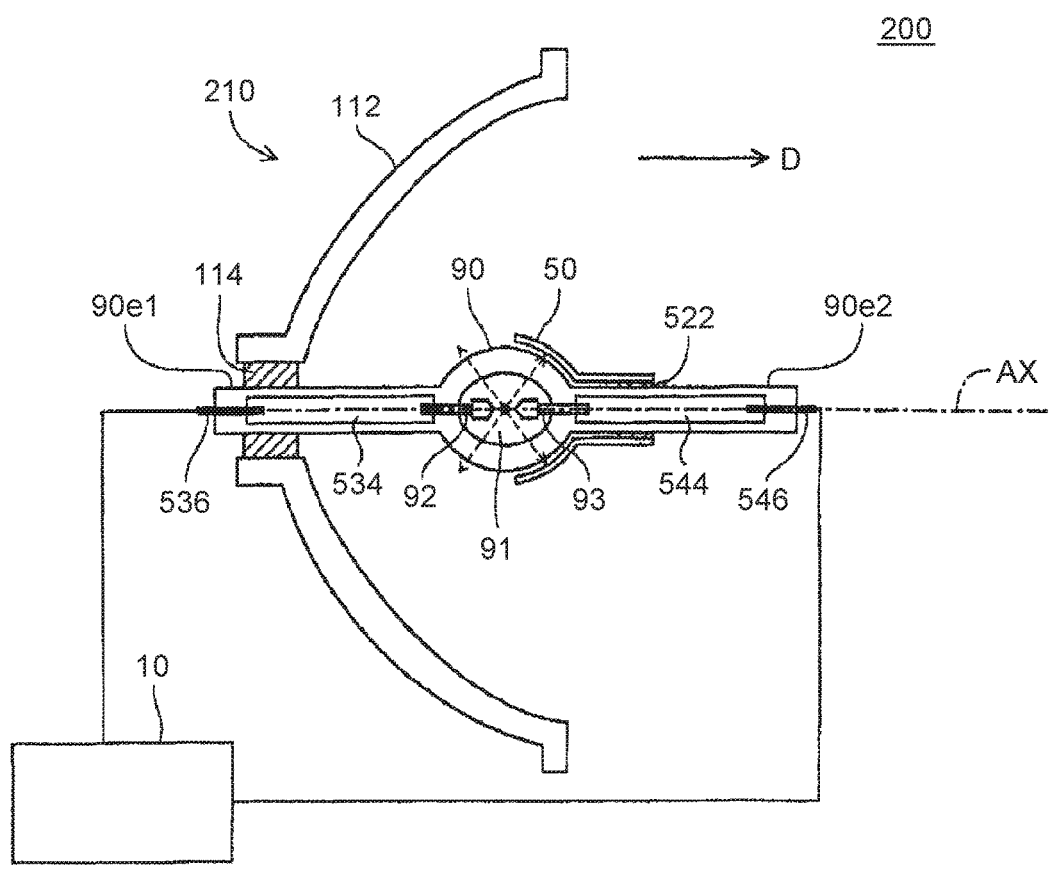
FIG. 2 is a sectional view of a discharge lamp in the embodiment.

FIG. 2 is a sectional view illustrating the configuration of the light source device 200. The light source device 200 includes a light source unit 210 and a discharge lamp lighting device (discharge lamp driving device) 10. FIG. 2 illustrates the sectional view of the light source unit 210. The light source unit 210 includes a primary reflector 112, a discharge lamp 90, and a sub-reflector 50.

The discharge lamp lighting device 10 turns on the discharge lamp 90 by supplying a drive current I to the discharge lamp 90. The primary reflector 112 reflects light emitted from the discharge lamp 90 toward an illumination direction D. The illumination direction D is parallel to an optical axis AX of the discharge lamp 90.

The shape of the discharge lamp 90 is a bar shape that extends along the illumination direction D. One end portion of the discharge lamp 90 is referred to as a first end portion 90e1, and the other end portion of the discharge lamp 90 is referred to as a second end portion 90e2. The material of the discharge lamp 90 is, for example, a light-transmissive material such as quartz glass. The center portion of the discharge lamp 90 is swollen in a spherical shape, and the inside thereof is a discharge space 91. The discharge space 91 contains gas sealed therein, which is a discharge medium containing noble gas, a metal halide compound, and the like.

The tip ends of a first electrode 92 and a second electrode 93 protrude into the discharge space 91. The first electrode 92 is disposed on the first end portion 90e1 side of the discharge space 91. The second electrode 93 is disposed on the second end portion 90e2 side of the discharge space 91. The shapes of the first electrode 92 and the second electrode 93 are bar shapes that extend along the optical axis AX. In the discharge space 91, the electrode tip end portions of the first electrode 92 and the second electrode 93 are disposed to face each other with a predetermined distance therebetween. The material of the first electrode 92 and the second electrode 93 is, for example, metal such as tungsten.

A first terminal 536 is provided in the first end portion 90e1 of the discharge lamp 90. The first terminal 536 and the first electrode 92 are electrically connected to each other by a conductive member 534 which penetrates through the inside of the discharge lamp 90. Similarly, a second terminal 546 is provided in the second end portion 90e2 of the discharge lamp 90. The second terminal 546 and the second electrode 93 are electrically connected to each other by a conductive member 544 which penetrates through the inside of the discharge lamp 90. The material of the first terminal 536 and the second terminal 546 is, for example, metal such as tungsten. As the material of the conductive members 534 and 544, for example, a molybdenum foil is used.

The first terminal 536 and the second terminal 546 are connected to the discharge lamp lighting device 10. The discharge lamp lighting device 10 supplies the drive current I for driving the discharge lamp 90 to the first terminal 536 and the second terminal 546. As a result, an arc discharge is generated between the first electrode 92 and the second electrode 93. Light generated by the arc discharge (discharge light) is emitted in all directions from a discharge position, as indicated by a broken line arrow.

The primary reflector 112 is fixed to the first end portion 90e1 of the discharge lamp 90 by a fixing member 114. The primary reflector 112 reflects light that propagates toward the opposite side of the illumination direction D in the discharge light toward the illumination direction D. The shape of the reflective surface (a surface on the discharge lamp 90 side) of the primary reflector 112 is not particularly limited as long as the shape is in such a range to reflect the discharge light toward the illumination direction D, and may also be a rotated oval shape or a rotated parabola shape. For example, in a case where the shape of the reflective surface of the primary reflector 112 is a rotated parabola shape, the primary reflector 112 can convert the discharge light into light that is substantially parallel to the optical axis AX. Accordingly, the collimating lens 305 may be omitted.

The sub-reflector 50 is fixed to the second end portion 90e2 of the discharge lamp 90 by a fixing member 522. The shape of the reflective surface (a surface on the discharge lamp 90 side) of the sub-reflector 50 is a spherical shape that surrounds a section of the discharge space 91 on the second end portion 90e2 side. The sub-reflector 50 reflects light that propagates toward the opposite side of a side on which the primary reflector 112 is disposed, in the discharge light, toward the primary reflector 112. Accordingly, the use efficiency of the light emitted from the discharge space 91 can be increased.

The material of the fixing members 114 and 522 is not particularly limited as long as the material is in the range of a heat-resistant material that can withstand heat generated by the discharge lamp 90, and for example, is an inorganic adhesive. As a method of fixing the arrangement of the primary reflector 112, the sub-reflector 50, and the discharge lamp 90, an arbitrary method may be employed without limitation to a method of fixing the primary reflector 112 and the sub-reflector 50 to the discharge lamp 90. For example, the discharge lamp 90 and the primary reflector 112 may be independently fixed to a case (not illustrated) of the projector 500. The same is applied to the sub-reflector 50.

Hereinafter, the circuit diagram of the projector 500 will be described.

Figure 3:
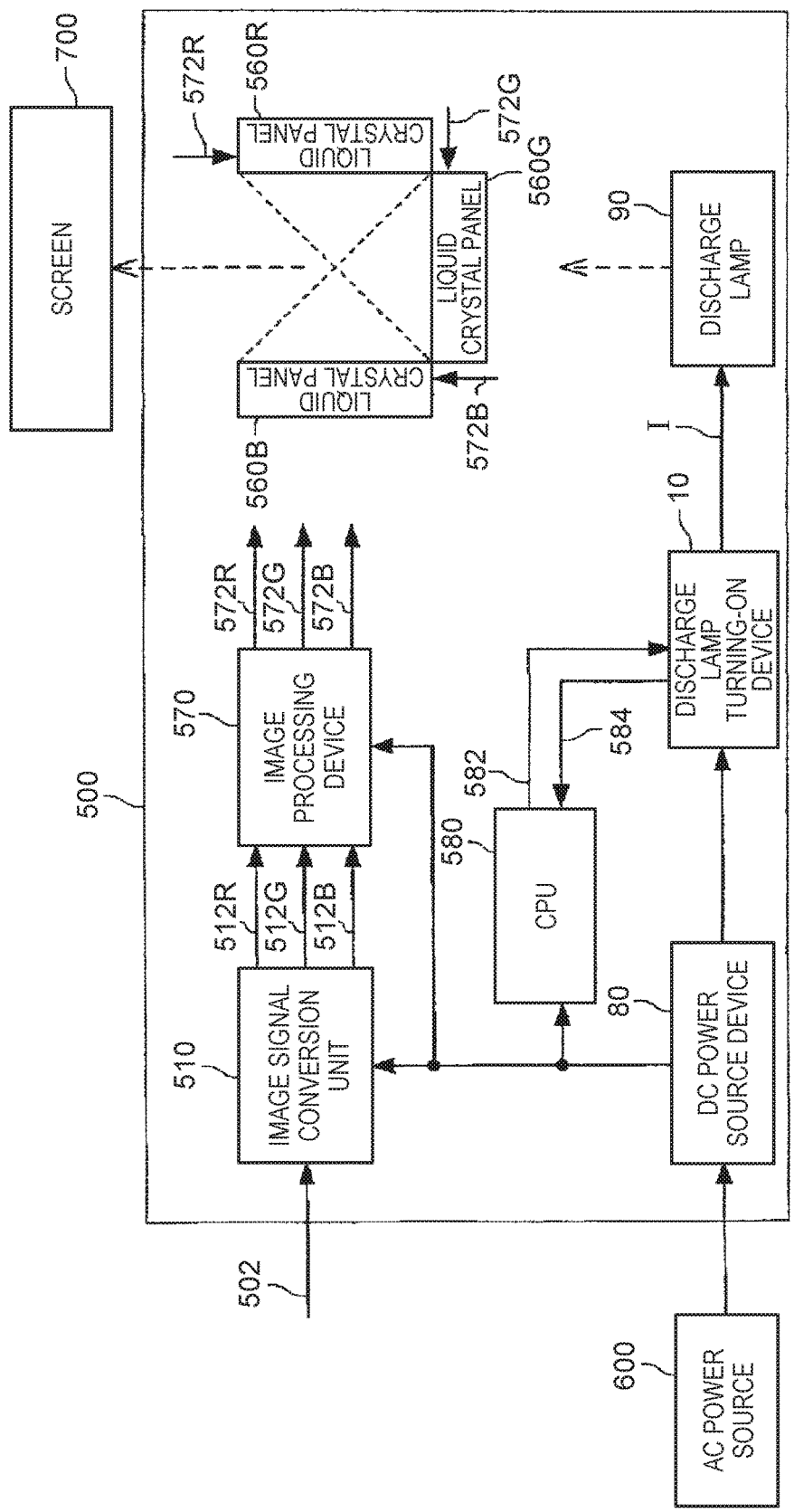
FIG. 3 is a block diagram of constituent elements of the projector of the embodiment.

FIG. 3 is a view illustrating an example of the circuit diagram of the projector 500 of this embodiment. The projector 500 includes, in addition to the optical systems illustrated in FIG. 1, an image signal conversion unit 510, a DC power source device 80, the liquid crystal panels 560R, 560G, and 560B, an image processing device 570, and a central processing unit (CPU) 580.

The image signal conversion unit 510 generates image signals 512R, 512G, 512B by converting an image signal 502 (a luminance-color difference signal, an analog RGB signal, or the like) input from the outside into digital RGB signals having a predetermined word length and supplies the generated signals to the image processing device 570.

The image processing device 570 performs image processing on each of the three image signals 512R, 512G, and 512B. The image processing device 570 supplies drive signals 572R, 572G, and 572B for respectively driving the liquid crystal panels 560R, 560G, and 560B to the liquid crystal panels 560R, 560G, and 560B.

The DC power source device 80 converts an AC voltage supplied from an external AC power source 600 into a constant DC voltage. The DC power source device 80 supplies the DC voltage to the image signal conversion unit 510 and the image processing device 570 provided on the secondary side of a transformer (included in the DC power source device 80 although not illustrated) and to the discharge lamp lighting device 10 provided on the primary side of the transformer.

The discharge lamp lighting device 10 generates a high voltage between the electrodes of the discharge lamp 90 at the time of start-up to initiate a dielectric breakdown and form a discharge path. Thereafter, the discharge lamp lighting device 10 supplies the drive current I for maintaining the discharge in the discharge lamp 90.

The liquid crystal panels 560R, 560G, and 560B are respectively provided in the liquid crystal light valves 330R, 330G, and 330B described above. The liquid crystal panels 560R, 560G, and 560B modulate the transmittance (luminance) of the color beams that are respectively incident onto the liquid crystal panels 560R, 560G, and 560B via the above-described optical systems, on the basis of the drive signals 572R, 572G, and 572B.

The CPU 580 controls various operations from the lighting start of the projector 500 until the projector 500 is turned off. For example, in FIG. 3, a lighting command and a putting-out command are output to the discharge lamp lighting device 10 via a communication signal 582. The CPU 580 receives lighting information of the discharge lamp 90 from the discharge lamp lighting device 10 via a communication signal 584.

Hereinafter, the configuration of the discharge lamp lighting device 10 will be described.

Figure 4:
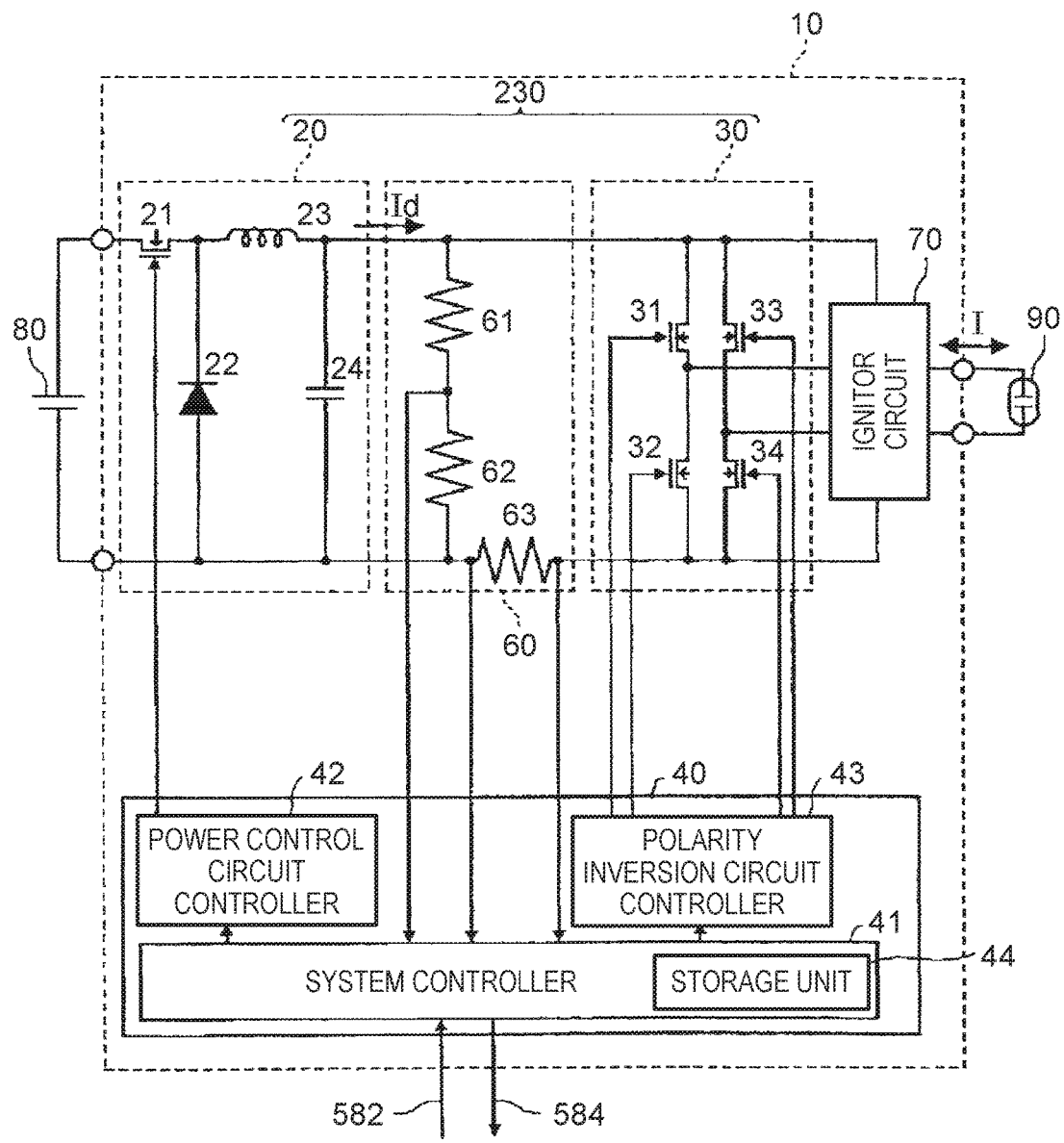
FIG. 4 is a circuit diagram of a discharge lamp lighting device of the embodiment.

FIG. 4 is a view illustrating an example of the circuit diagram of the discharge lamp lighting device 10.

As illustrated in FIG. 4, the discharge lamp lighting device 10 includes a power control circuit 20, a polarity inversion circuit 30, a control unit 40, an operation detection unit 60, and an ignitor circuit 70.

The power control circuit 20 generates drive power supplied to the discharge lamp 90. In this embodiment, the power control circuit 20 is configured as a down chopper circuit which receives a voltage as an input from the DC power source device 80, reduces the input voltage, and outputs a DC current Id.

The power control circuit 20 is configured to include a switch element 21, a diode 22, a coil 23, and a capacitor 24. The switch element 21 is configured as, for example, a transistor. In this embodiment, one end of the switch element 21 is connected to the positive voltage side of the DC power source device 80, and the other end thereof is connected to the cathode terminal of the diode 22 and one end of the coil 23.

One end of the capacitor 24 is connected to the other end of the coil 23, and the other end of the capacitor 24 is connected to the anode terminal of the diode 22 and the negative voltage side of the DC power source device 80. A current control signal is input to the control terminal of the switch element 21 from the control unit 40, which will be described later, so that ON/OFF of the switch element 21 is controlled. As the current control signal, for example, a pulse width modulation (PWM) control signal may be used.

When the switch element 21 is turned on, current flows through the coil 23 and energy is accumulated in the coil 23. Thereafter, when the switch element 21 is turned off, the energy accumulated in the coil 23 is discharged through paths that pass through the capacitor 24 and the diode 22. As a result, the DC current Id corresponding to the ratio of a time for which the switch element 21 is turned on is generated.

The polarity inversion circuit 30 inverts the polarity of the DC current Id input from the power control circuit 20 at a predetermined timing. Accordingly, the polarity inversion circuit 30 generates and outputs a DC drive current I which is continuous only for controlled time or an AC drive current I having an arbitrary frequency. In this embodiment, the polarity inversion circuit 30 is configured as an inverter bridge circuit (full bridge circuit).

The polarity inversion circuit 30 includes a first switch element 31, a second switch element 32, a third switch element 33, and a fourth switch element 34, which are configured as, for example, a transistor or the like. The polarity inversion circuit 30 has a configuration in which the first and second switch elements 31 and 32, which are connected in series, and the third and fourth switch elements 33 and 34, which are connected in series, are connected in parallel. To each of the control terminals of the first, second, third, and fourth switch elements 31, 32, 33, and 34, a polarity inversion control signal is input from the control unit 40. On the basis of the polarity inversion control signal, ON/OFF operations of the first, second, third, and fourth switch elements 31, 32, 33, and 34 are controlled.

In the polarity inversion circuit 30, an operation of alternately turning on and off the first and fourth switch elements 31 and 34 and the second and third switch elements 32 and 33 is repeated. Accordingly, the polarity of the DC current Id output from the power control circuit 20 is alternately inverted. In the polarity inversion circuit 30, a DC drive current I for allowing the same polarity state to be continued only for a controlled time, or an AC drive current I having a controlled frequency are generated and output from a common connection point of the first and second switch elements 31 and 32 and a common connection point of the third and fourth switch elements 33 and 34.

That is, the polarity inversion circuit 30 is controlled so that the second and third switch elements 32 and 33 are turned off when the first and fourth switch elements 31 and 34 are turned on, and the second and third switch elements 32 and 33 are turned on when the first and fourth switch elements 31 and 34 are turned off. Therefore, when the first and fourth switch elements 31 and 34 are turned on, a drive current I which flows through the one end of the capacitor 24, the first switch element 31, the discharge lamp 90, and the fourth switch element 34 in this order is generated. When the second and third switch elements 32 and 33 are turned on, a drive current I which flows through the one end of the capacitor 24, the third switch element 33, the discharge lamp 90, and the second switch element 32 in this order is generated.

In this embodiment, the addition of the power control circuit 20 and the polarity inversion circuit 30 corresponds to a discharge lamp driving unit 230. That is, the discharge lamp driving unit 230 supplies the drive current I for driving the discharge lamp 90 to the discharge lamp 90.

The control unit 40 controls the discharge lamp driving unit 230. In the example of FIG. 4, the control unit 40 controls parameters such as a holding time for which the drive current I continuously has the same polarity, the current value of the drive current I (the power value of drive power), frequencies, and the like by controlling the power control circuit 20 and the polarity inversion circuit 30. The control unit 40 performs polarity inversion control for controlling the holding time for which the drive current I continuously has the same polarity, the frequency of the drive current I, and the like on the polarity inversion circuit 30 according to a polarity inversion timing of the drive current I. The control unit 40 performs current control for controlling the current value of the output DC current Id on the power control circuit 20.

The control unit 40 can perform first discharge lamp driving in which first control and second control are performed as a control method of the discharge lamp driving unit 230. The control unit 40 can perform second discharge lamp driving in which third control and fourth control are performed as a control method of the discharge lamp driving unit 230. Third discharge lamp driving in which fifth control and sixth control are performed as a control method of the discharge lamp driving unit 230 can be performed. Fourth discharge lamp driving in which seventh control and eighth control are performed as a control method of the discharge lamp driving unit 230 can be performed. Each of the first to eighth control is a control method of supplying a drive current I including a DC current and an AC current to the discharge lamp 90. In this embodiment, the control unit 40 controls the discharge lamp driving unit 230 by changing driving of the discharge lamp 90 from the first discharge lamp driving to the fourth discharge lamp driving on the basis of a lamp voltage (inter-electrode voltage) V1$a$. Details will be described later.

The configuration of the control unit 40 is not particularly limited. In this embodiment, the control unit 40 is configured to include a system controller 41, a power control circuit controller 42, and a polarity inversion circuit controller 43. In addition, a portion or the entirety of the control unit 40 may be configured as a semiconductor integrated circuit.

The system controller 41 controls the power control circuit 20 and the polarity inversion circuit 30 by controlling the power control circuit controller 42 and the polarity inversion circuit controller 43. The system controller 41 may control the power control circuit controller 42 and the polarity inversion circuit controller 43 on the basis of the lamp voltage V1$a$ detected by the operation detection unit 60 and the drive current I.

In this embodiment, a storage unit 44 is connected to the system controller 41.

The system controller 41 may also control the power control circuit 20 and the polarity inversion circuit 30 on the basis of information stored in the storage unit 44. The storage unit 44 may store information regarding drive parameters such as the holding time for which the drive current I continuously has the same polarity, and the current value, fundamental frequency, waveform, modulation pattern, and the like of the drive current I. The fundamental frequency is the frequency of the drive current I supplied to the discharge lamp 90 in a steady lighting mode.

The storage unit 44 in this embodiment stores, for example, the drive current waveform of the drive current I supplied to the discharge lamp 90 in each discharge lamp driving, the values of a transition voltage and a reverse transition voltage used to determine transitions of the discharge lamp driving, the value of a threshold voltage used for switching of a control method in each discharge lamp driving, and the like.

In this specification, a reverse transition particularly means a transition of discharge lamp driving from driving with a high thermal load to driving with a low thermal load.

The power control circuit controller 42 controls the power control circuit 20 by outputting the current control signal to the power control circuit 20 on the basis of the control signal from the system controller 41.

The polarity inversion circuit controller 43 controls the polarity inversion circuit 30 by outputting the polarity inversion control signal to the polarity inversion circuit 30 on the basis of the control signal from the system controller 41.

The control unit 40 is realized by using a dedicated circuit, and can perform the above-described control and various control operations of processes described later. Otherwise, for example, the control unit 40 may function as a computer by causing a CPU to execute a control program stored in the storage unit 44 so as to perform the various control operations of processes.

Figure 5:
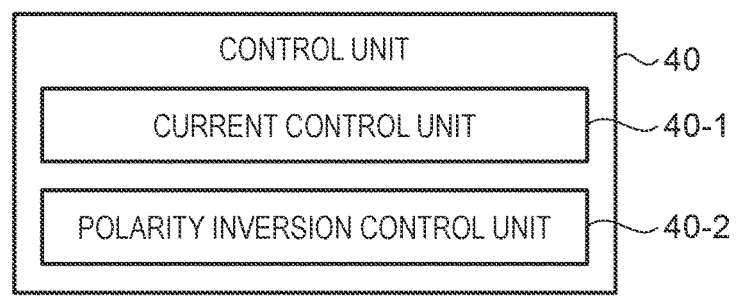
FIG. 5 is a block diagram illustrating a configuration example of a control unit of the embodiment.

FIG. 5 is a view illustrating another configuration example of the control unit 40. As illustrated in FIG. 5, the control unit 40 may also be configured to function as a current control unit 40-1 that controls the power control circuit 20 and a polarity inversion control unit 40-2 that controls the polarity inversion circuit 30 according to the control program.

In the example illustrated in FIG. 4, the control unit 40 is configured as a section of the discharge lamp lighting device 10. Otherwise, a portion of the function of the control unit 40 may be configured to be covered by the CPU 580.

In this embodiment, the operation detection unit 60 includes a voltage detection unit which detects the lamp voltage V1$a$ of the discharge lamp 90 and outputs lamp voltage information to the control unit 40. In addition, the operation detection unit 60 may also include a current detection unit which detects the drive current I and outputs drive current information to the control unit 40. In this embodiment, the operation detection unit 60 may also be configured to include a first resistor 61, a second resistor 62, and a third resistor 63.

In this embodiment, the voltage detection unit of the operation detection unit 60 detects the lamp voltage V1$a$ by a voltage divided by the first resistor 61 and the second resistor 62 which are connected in series to be parallel to the discharge lamp 90. In addition, in this embodiment, the current detection unit detects the drive current I by a voltage that occurs in the third resistor 63 connected to the discharge lamp 90 in series.

The ignitor circuit 70 is operated only during the lighting start of the discharge lamp 90. The ignitor circuit 70 supplies a high voltage necessary for destructing insulation between the electrodes (between the first electrode 92 and the second electrode 93) of the discharge lamp 90 during the lighting start of the discharge lamp 90 and forming a discharge path (a voltage that is higher than that at normal lighting of the discharge lamp 90) between the electrodes (between the first electrode 92 and the second electrode 93) of the discharge lamp 90. In this embodiment, the ignitor circuit 70 is connected to the discharge lamp 90 in parallel.

Figures 6A, 6B:
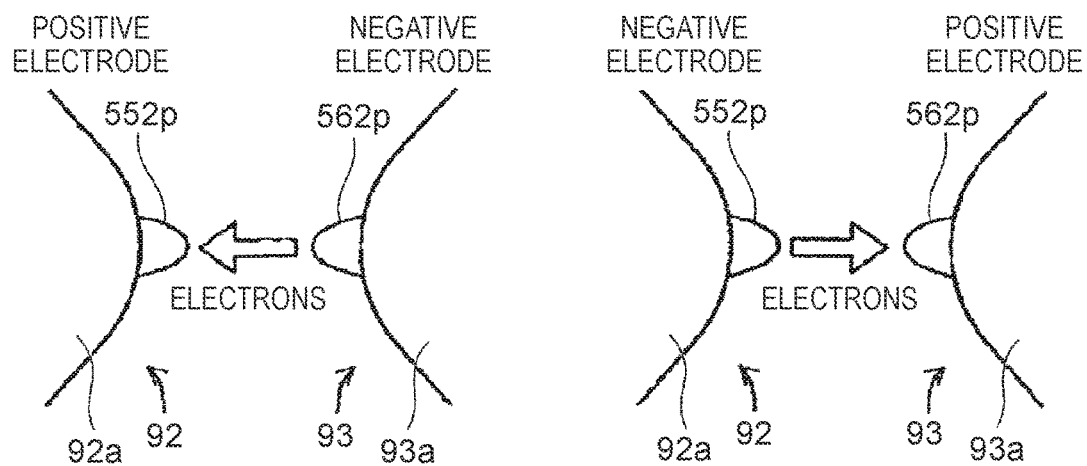
FIGS. 6A and 6B are views illustrating the shapes of protrusions of electrode tip ends of the discharge lamp.

FIGS. 6A and 6B illustrate the tip end portions of the first and second electrodes 92 and 93. Protrusions 552$p$ and 562$p$ are respectively formed at the tip ends of the first and second electrodes 92 and 93. The protrusion 552$p$ protrudes from an electrode body 92$a$ of the first electrode 92 toward the second electrode 93 side. The protrusion 562$p$ protrudes from an electrode body 93$a$ of the second electrode 93 toward the first electrode 92 side.

A discharge generated between the first and second electrodes 92 and 93 is primarily formed between the protrusions 552$p$ and 562$p$. In a case where the protrusions 552$p$ and 562$p$ are provided as in this embodiment, compared to a case where there is no protrusion, movement of discharge positions (arc position) in the first and second electrodes 92 and 93 can be suppressed.

FIG. 6A illustrates a first polarity state in which the first electrode 92 is operated as a positive electrode and the second electrode 93 is operated as a negative electrode. In the first polarity state, electrons move from the second electrode 93 (negative electrode) to the first electrode 92 (positive electrode) by the discharge. The electrons are emitted from the negative electrode (the second electrode 93). The electrons emitted from the negative electrode (the second electrode 93) collide with the tip end of the positive electrode (the first electrode 92). Due to the collision, heat is generated, and thus the temperature of the tip end (the protrusion 552$p$) of the positive electrode (the first electrode 92) is increased.

FIG. 6B illustrates a second polarity state in which the first electrode 92 is operated as a negative electrode and the second electrode 93 is operated as a positive electrode. In the second polarity state, reversely to the first polarity state, electrons move from the first electrode 92 to the second electrode 93. As a result, the temperature of the tip end (the protrusion 562$p$) of the second electrode 93 is increased.

As described above, the temperature of the positive electrode with which electrons collide is increased as the drive current I is supplied to the discharge lamp 90. On the other hand, the temperature of the negative electrode which emits the electrons is decreased while emitting the electrons toward the positive electrode.

The inter-electrode distance between the first and second electrodes 92 and 93 is increased as the protrusions 552$p$ and 562$p$ are deteriorated. This is because the protrusions 552$p$ and 562$p$ wear down. When the inter-electrode distance is increased, the resistance between the first and second electrodes 92 and 93 is increased, resulting in an increase in the lamp voltage V1$a$. Therefore, a change in the inter-electrode distance, that is, the degree of deterioration of the discharge lamp 90 can be detected by referring to the lamp voltage V1$a$.

In addition, since the first and second electrodes 92 and 93 have the same configuration, there may be cases where only the first electrode 92 is representatively described in the following description. In addition, since the protrusion 552$p$ of the tip end of the first electrode 92 and the protrusion 562$p$ of the tip end of the second electrode 93 have the same configuration, there may be cases where only the protrusion 552$p$ is representatively described in the following description.

Hereinafter, control of the discharge lamp driving unit 230 performed by the control unit 40 of this embodiment will be described.

First, a transition of the driving of the discharge lamp 90 of this embodiment will be described.

Figure 7:
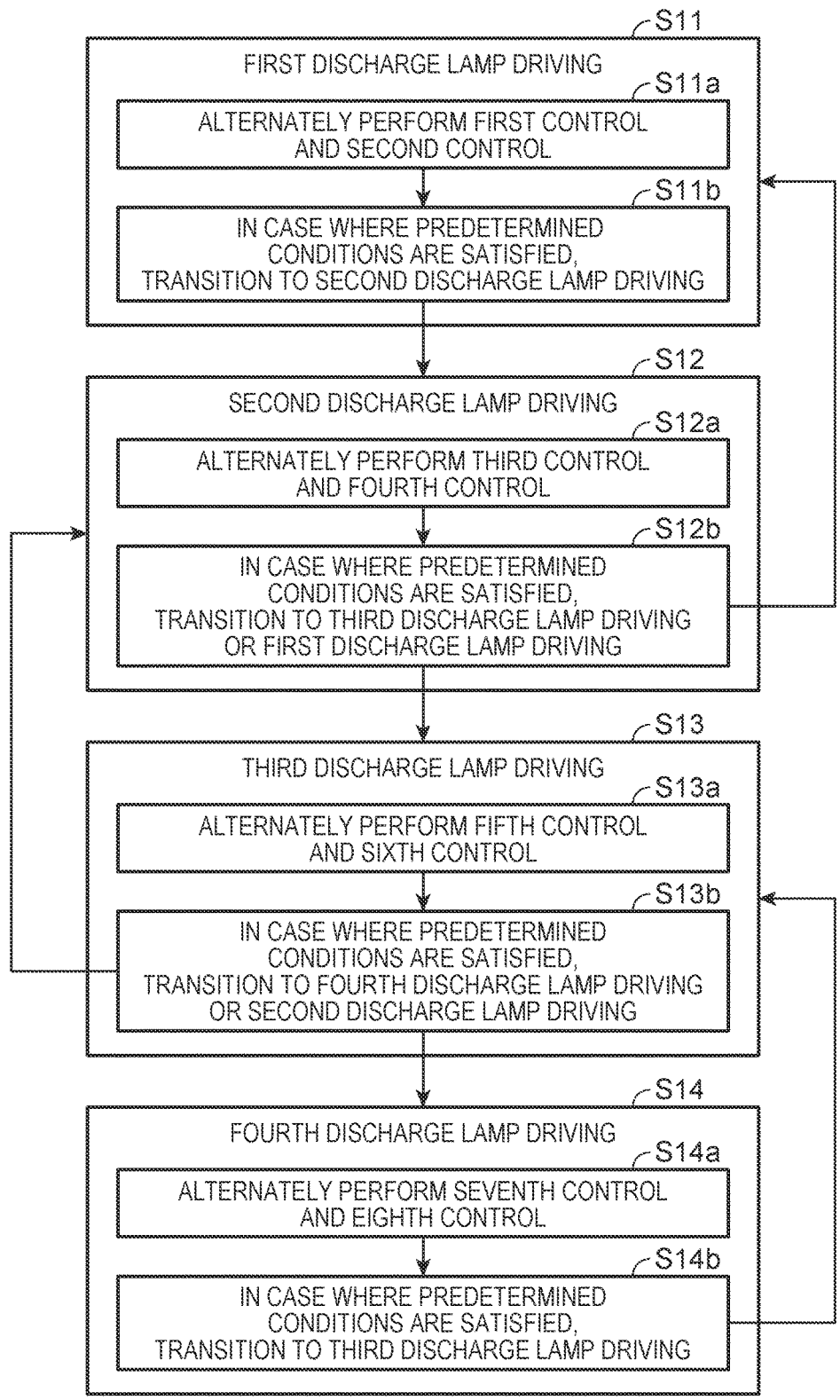
FIG. 7 is a flowchart illustrating an example of a transition order of discharge lamp driving performed by the control unit of the embodiment.

FIG. 7 is a flowchart illustrating an example of a transition order of the discharge lamp driving performed by the control unit 40 of this embodiment.

As illustrated in FIG. 7, the control unit 40 performs the first discharge lamp driving at an initial stage of lighting of the discharge lamp 90 (Step S11). During the first discharge lamp driving, the first control and the second control are alternately performed (Step S11*a*). In addition, in a case where predetermined conditions are satisfied, the control unit 40 transitions the driving of the discharge lamp 90 from the first discharge lamp driving to the second discharge lamp driving (Step S11*b*).

During the second discharge lamp driving (Step S12), the third control and the fourth control are alternately performed (Step S12*a*). In addition, in a case where predetermined conditions are satisfied, the control unit 40 transitions the driving of the discharge lamp 90 from the second discharge lamp driving to the third discharge lamp driving or the first discharge lamp driving (Step S12*b*).

During the third discharge lamp driving (Step S13), the fifth control and the sixth control are alternately performed (Step S13*a*). In addition, in a case where predetermined conditions are satisfied, the control unit 40 transitions the driving of the discharge lamp 90 from the third discharge lamp driving to the fourth discharge lamp driving or the second discharge lamp driving (Step S13*b*).

During the fourth discharge lamp driving (Step S14), the seventh control and the eighth control are alternately performed (Step S14*a*). In addition, in a case where predetermined conditions are satisfied, the control unit 40 transitions the driving of the discharge lamp 90 to the third discharge lamp driving (Step S14*b*).

As described above, the control unit 40 in this embodiment drives the discharge lamp 90 by changing the driving of the discharge lamp 90 between the first to fourth discharge lamp drivings.

Next, each discharge lamp driving will be described in detail.

Figure 8:
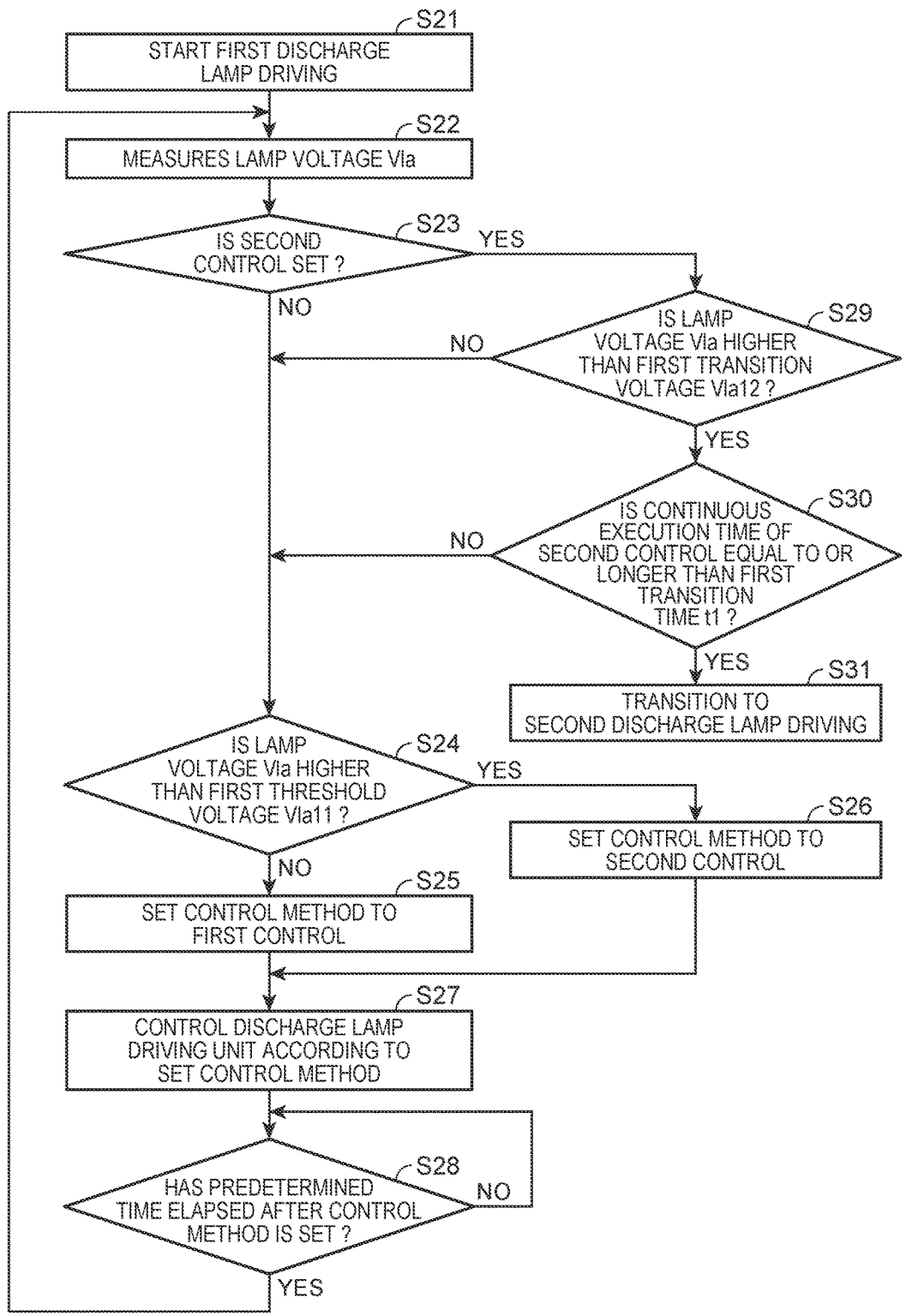
FIG. 8 is a flowchart illustrating an example of a control order of the control unit during first discharge lamp driving of the embodiment.
Figure 9:
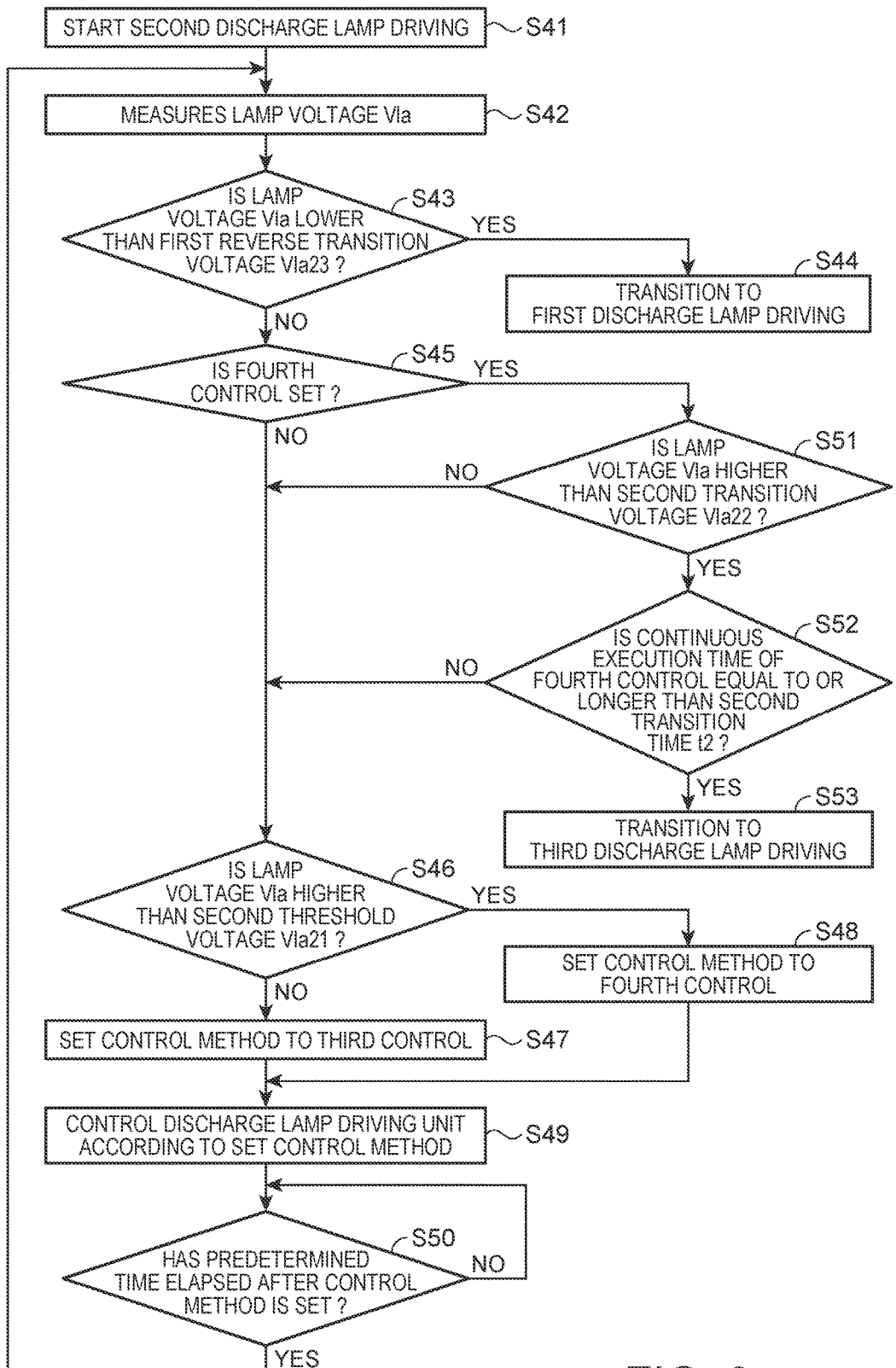
FIG. 9 is a flowchart illustrating an example of a control order of the control unit during second discharge lamp driving of the embodiment.

FIG. 8 is a flowchart illustrating an example of a control order of the control unit 40 during the first discharge lamp driving. FIG. 9 is a flowchart illustrating an example of a control order of the control unit 40 during the second discharge lamp driving.

As illustrated in FIG. 8, after the start of the first discharge lamp driving (Step S21), the control unit 40 measures the lamp voltage V1*a* using the voltage detection unit of the operation detection unit 60 (Step S22). In addition, the control unit 40 determines whether or not the second control is set as the control method (Step S23). When the second control is not set as the control method (No in Step S23), the control unit 40 determines whether or not the measured lamp voltage V1*a* is higher than a first threshold voltage V1*a*11. (Step S24).

When the measured lamp voltage V1*a* is equal to or lower than the first threshold voltage V1*a*11 (No in Step S24), the control unit 40 sets the control method of the discharge lamp driving unit 230 to the first control (Step S25). When the measured lamp voltage V1*a* is higher than the first threshold voltage V1*a*11 (Yes in Step S24), the control unit 40 sets the control method of the discharge lamp driving unit 230 to the second control (Step S26). The control unit 40 controls the discharge lamp driving unit 230 according to the set control method (Step S27).

During the first control and the second control, a drive current I including a DC current and an AC current is supplied to the discharge lamp 90. The ratio of the DC current during the second control is higher than the ratio of the DC current during the first control. The first control and the second control will be described in a later section.

The control unit 40 determines whether or not a predetermined time has elapsed after the start of the control of the discharge lamp driving unit 230 according to the set control method (Step S28). When the predetermined time has not elapsed (No in Step S28), the control unit 40 continuously controls the discharge lamp driving unit 230 according to the set control method. When the predetermined time has elapsed (Yes in Step S28), the control unit 40 measures the lamp voltage V1*a* again (Step S22) and performs the above-described determination.

That is, in this embodiment, a predetermined set timing at which the lamp voltage V1*a* is measured (Step S22) and the control method of the discharge lamp driving unit 230 is set (Steps S24 to S26) is provided every predetermined time.

A predetermined time from a predetermined set timing to a subsequent predetermined set timing is preferably set to 60 seconds or longer, and is more preferably set to 300 seconds or longer. By setting the predetermined time as described above, it is possible to perform the first control and the second control for certain periods of times, and the protrusion 552*p* of the first electrode 92 can be easily maintained in a stable shape.

In a case where the second control is set as the control method in Step S23 (Yes in Step S23), the control unit 40 determines whether or not to perform a transition to the second discharge lamp driving.

First, the control unit 40 determines whether or not the lamp voltage V1*a* is higher than a first transition voltage V1*a*12 (Step S29). The first transition voltage V1*a*12 is set to be equal to or higher than the first threshold voltage V1*a*11. For example, the first transition voltage V1*a*12 in this embodiment is higher than the first threshold voltage V1*a*11 and is lower than a second threshold voltage V1*a*21 to be described later.

In a case where the lamp voltage V1*a* is higher than the first transition voltage V1*a*12 (Yes in Step S29), the control unit 40 determines whether or not a continuous execution time of the second control is equal to or longer than a first transition time t1 (Step S30). The first transition time t1 is set to, for example, about 20 minutes.

In this specification, a continuous execution time includes a cumulative time for which, after a single control method is set, the single set control method is continuously performed without being switched to another control method. That is, for example, when the control method is not switched to another control method, even in a case where the discharge lamp 90 is turned off in the meantime, execution times of the single control method performed before and after the putting-out of the discharge lamp 90 are accumulated in the continuous execution time.

For example, a case where the discharge lamp 90 is turned off when the second control is set will be described in detail. In this case, in a case where second control is performed without another control such as the first control being performed after the discharge lamp 90 is turned on again, the continuous execution time of the second control is a cumulative time of a time for which the second control is performed before the discharge lamp 90 is turned off and a time for which the second control is performed after the discharge lamp 90 is turned on again.

In a case where the continuous execution time of the second control is equal to or longer than the first transition time t1 (Yes in Step S30), the control unit 40 transitions the driving of the discharge lamp 90 from the first discharge lamp driving to the second discharge lamp driving (Step S31).

In a case where the lamp voltage V1$a$ is equal to or lower than the first transition voltage V1$a$12 (No in Step S29) and in a case where the continuous execution time of the second control is shorter than the first transition time t1 (No in Step S30), the control unit 40 compares the lamp voltage V1$a$ to the first threshold voltage V1$a$11 (Step S24) and performs setting of the control method (Steps S25 and S26).

As described above, during the second control of the first discharge lamp driving, in a case where the lamp voltage V1$a$ is higher than the first transition voltage V1$a$12 that is equal to or higher than the first threshold voltage V1$a$11 and the continuous execution time of the second control is equal to or longer than the first transition time t1, the control unit 40 transitions the driving of the discharge lamp 90 from the first discharge lamp driving to the second discharge lamp driving.

As illustrated in FIG. 9, after the start of the second discharge lamp driving (Step S41), the control unit 40 measures the lamp voltage V1$a$ using the voltage detection unit of the operation detection unit 60 (Step S42). In addition, the control unit 40 determines whether or not the lamp voltage V1$a$ is lower than a first reverse transition voltage V1$a$23 (Step S43). In a case where the lamp voltage V1$a$ is lower than the first reverse transition voltage V1$a$23 (Yes in Step S43), the control unit 40 transitions the driving of the discharge lamp 90 from the second discharge lamp driving to the first discharge lamp driving (Step S44).

On the other hand, in a case where the lamp voltage V1$a$ is equal to or higher than the first reverse transition voltage V1$a$23 (No in Step S43), similar to the first discharge lamp driving, the control unit 40 performs determination of a transition to the third discharge lamp driving (Steps S45 to S53) and setting of the control method of the discharge lamp driving unit 230 (Steps S46 to S50).

That is, the control unit 40 determines whether or not the value of the lamp voltage V1$a$ is higher than the second threshold voltage V1$a$21 and sets any of the third control and the fourth control as the control method of the discharge lamp driving unit 230. In addition, during the fourth control, in a case where the lamp voltage V1$a$ is higher than a second transition voltage V1$a$22 and the continuous execution time of the fourth control is longer than a second transition time t2, the control unit 40 transitions the driving of the discharge lamp 90 from the second discharge lamp driving to the third discharge lamp driving.

Steps S45 to S53 correspond to Steps S23 to S31 during the first discharge lamp driving.

The first reverse transition voltage V1$a$23 is lower than the second threshold voltage V1$a$21. In this embodiment, the first reverse transition voltage V1$a$23 is lower than the first threshold voltage V1$a$11.

The ratio of the DC current during the third control is substantially equal to the ratio of the DC current during the first control. The ratio of the DC current during the fourth control is higher than the ratio of the DC current during the third control and is higher than the ratio of the DC current during the second control. The second threshold voltage V1$a$21 is higher than the first threshold voltage V1$a$11. The second transition time t2 may be the same as or different from the first transition time t1.

In this specification, that the ratios of the DC currents are substantially equal to each other includes that the ratio of the ratios of DC currents to be compared is in a range of about 0.9 to 1.1.

During the third discharge lamp driving, similar to the second discharge lamp driving described above, the control unit 40 determines whether or not the value of the lamp voltage V1$a$ is higher than a third threshold voltage V1$a$31 and sets any of the fifth control and the sixth control as the control method of the discharge lamp driving unit 230. In addition, during the sixth control, in a case where the lamp voltage V1$a$ is higher than a third transition voltage V1$a$32 and the continuous execution time of the sixth control is longer than a third transition time t3, the control unit 40 transitions the driving of the discharge lamp 90 from the third discharge lamp driving to the fourth discharge lamp driving. In a case where the lamp voltage V1$a$ is lower than the second reverse transition voltage V1$a$33, the control unit 40 performs a transition to the second discharge lamp driving.

The ratio of the DC current during the fifth control is substantially equal to the ratio of the DC current during the third control. The ratio of the DC current during the sixth control is higher than the ratio of the DC current during the fifth control and is higher than the ratio of the DC current during the fourth control. The third threshold voltage V1$a$31 is higher than the second threshold voltage V1$a$21. The third transition time t3 may be the same as or different from the first transition time t1 or the second transition time t2.

The second reverse transition voltage V1$a$33 is higher than the first reverse transition voltage V1$a$23 and is lower than the third threshold voltage V1$a$31. In this embodiment, for example, the second reverse transition voltage V1$a$33 is lower than the second threshold voltage V1$a$21.

During the fourth discharge lamp driving, similar to the first discharge lamp driving described above, the control unit 40 determines whether or not the value of the lamp voltage V1$a$ is higher than a fourth threshold voltage V1$a$41 and sets any of the seventh control and the eighth control as the control method of the discharge lamp driving unit 230. In addition, in a case where the lamp voltage V1$a$ is lower than a third reverse transition voltage V1$a$43, a transition to the third discharge lamp driving is performed.

The ratio of the DC current during the seventh control is substantially equal to the ratio of the DC current during the fifth control. The ratio of the DC current during the eighth control is higher than the ratio of the DC current during the seventh control and is higher than the ratio of the DC current during the sixth control. The fourth threshold voltage V1$a$41 is higher than the third threshold voltage V1$a$31.

The third reverse transition voltage V1$a$43 is higher than the second reverse transition voltage V1$a$33 and is lower than the fourth threshold voltage V1$a$41. In this embodiment, for example, the third reverse transition voltage V1$a$43 is lower than the third threshold voltage V1$a$31.

Switching between the first control and the second control, switching between the third control and the fourth control, switching between the fifth control and the sixth control, and switching between the seventh control and the eighth control are basically the same except that the values of the threshold voltages are different. Therefore, in the following description, there may be cases where only the switching between the first control and the second control during the first discharge lamp driving is representatively described.

Next, drive current waveforms supplied to the discharge lamp 90 during the first control to the eighth control will be described.

FIGS. 10A to 11C are views illustrating examples of portions of the drive current waveforms during the first control to the eighth control. In FIGS. 10A to 11C, the vertical axis represents the drive current I, and the horizontal axis represents time T. The drive current I is positive in case of the first polarity state and is negative in case of the second polarity state.

Each of waveforms illustrated in FIGS. 10A to 11C is a drive current waveform per unit time ta. In the following description, a portion of the drive current waveform illustrated in each of FIGS. 10A to 11C is referred to as a unit waveform.

In this embodiment, the drive current waveforms during the first control to the eighth control are formed by combining the unit waveforms illustrated in FIGS. 10A to 11C.

Figure 10A:
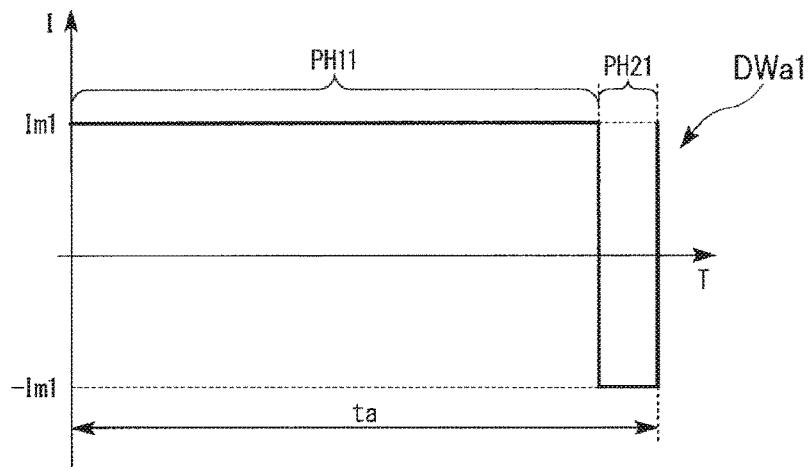
FIGS. 10A to 10C are views illustrating examples of drive current waveforms of the embodiment.

A unit waveform DWa1 illustrated in FIG. 10A has a DC duration PH11 for which a DC current is supplied to the discharge lamp 90, and an inverted polarity duration PH21 for which a current having the opposite polarity to the DC duration PH11 is supplied to the discharge lamp 90.

In the DC duration PH11, a drive current I having a first polarity with a constant current value of Im is supplied to the discharge lamp 90. In the inverted polarity duration PH21, a drive current I having a second polarity with a constant current value of −Im is supplied to the discharge lamp 90.

Figure 10B:
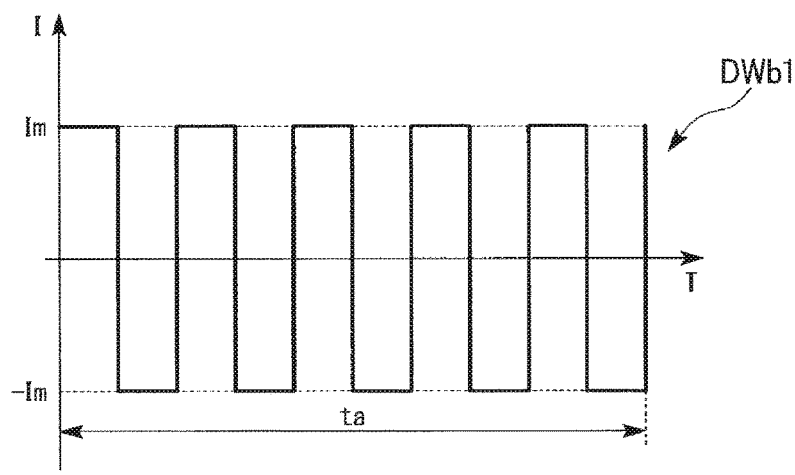
Figure 10C:
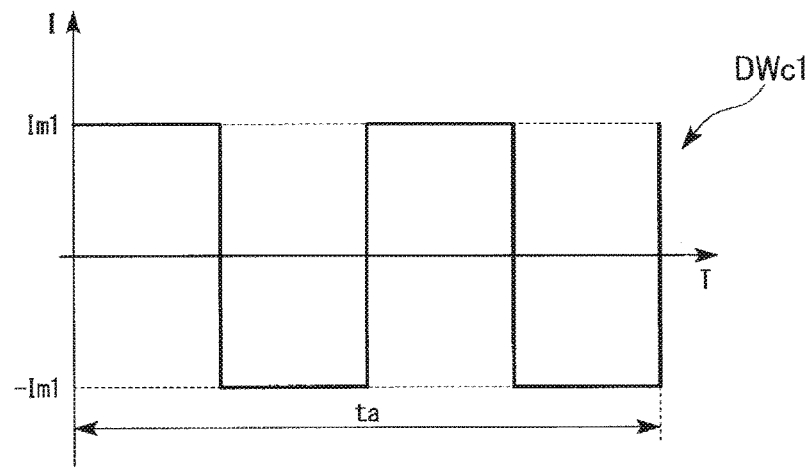

A unit waveform DWb1 illustrated in FIG. 10B and a unit waveform DWc1 illustrated in FIG. 10C are current waveforms of AC currents in which the polarity is inverted several times between a current value of Im1 and a current value of −Im1. The frequency (second frequency) of the AC current (second AC current) in the unit waveform DWc1 is lower than the frequency (first frequency) of the AC current (first AC current) in the unit waveform DWb1. In other words, an AC current during the first control and an AC current during the second control include the first AC current having the first frequency and the second AC current having the second frequency that is lower than the first frequency.

The frequency (first frequency) of the AC current in the unit waveform DWb1 is, for example, equal to or higher than 500 Hz. The frequency (second frequency) of the AC current in the unit waveform DWc1 is, for example, equal to or higher than 280 Hz. By setting the frequencies of the AC currents in the unit waveforms DWb1 and DWc1 as described above, the protrusion 552p of the first electrode 92 can be easily maintained in a stable shape.

Figure 11A:
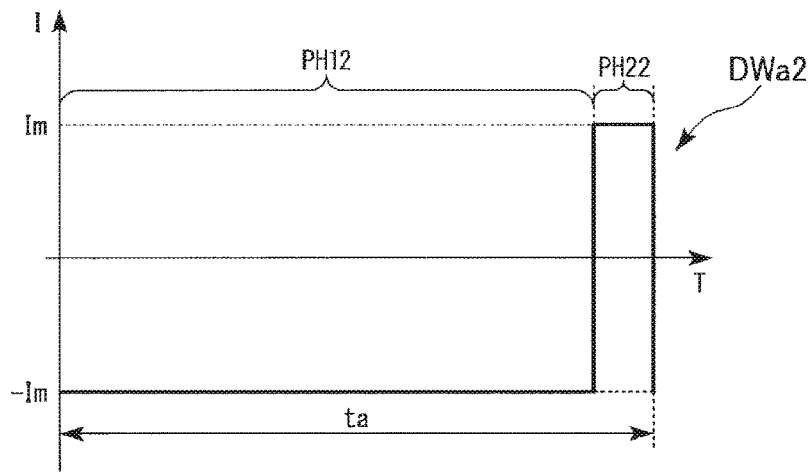
FIGS. 11A to 11C are views illustrating examples of the drive current waveforms of the embodiment.

A unit waveform DWa2 illustrated in FIG. 11A has a DC duration PH12 for which a DC current is supplied to the discharge lamp 90, and an inverted polarity duration PH22 for which a current having the opposite polarity to the DC duration PH12 is supplied to the discharge lamp 90. The unit waveform DWa2 is the same as the unit waveform DWa1 except that the polarity is inverted.

Figure 11B:
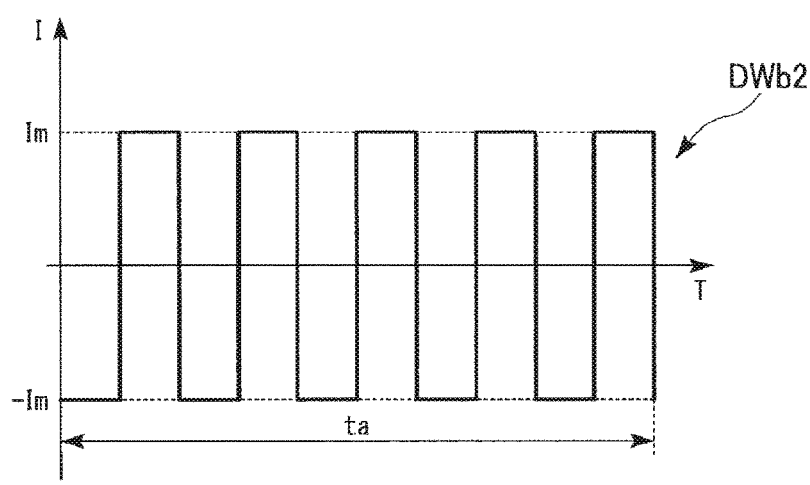

A unit waveform DWb2 illustrated in FIG. 11B is the same as the unit waveform DWb1 except that the polarity is inverted.

Figure 11C:
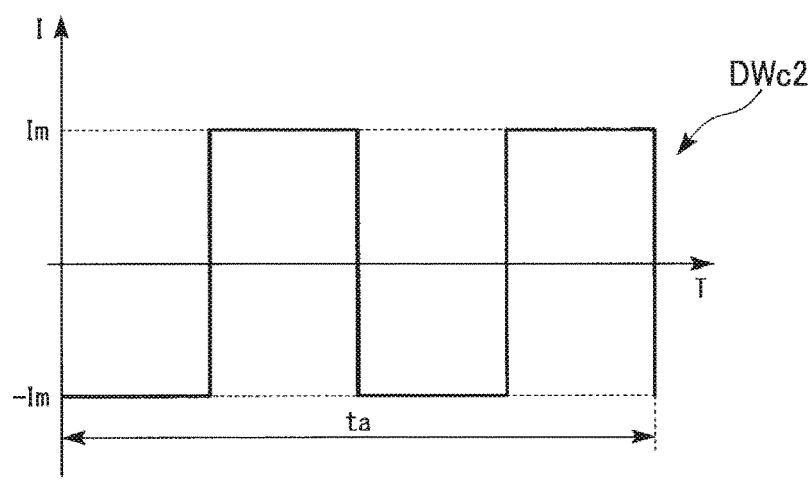

A unit waveform DWc2 illustrated in FIG. 11C is the same as the unit waveform DWc1 except that the polarity is inverted.

In the following description, the AC current in the unit waveforms DWb1 and DWb2 is referred to as a first AC current, and the frequency of the AC current in the unit waveforms DWb1 and DWb2 is referred to as a first frequency. In addition, the AC current in the unit waveforms DWc1 and DWc2 is referred to as a second AC current, and the frequency of the AC current in the unit waveforms DWc1 and DWc2 is referred to as a second frequency.

During the first control of the first discharge lamp driving of this embodiment, a cycle C1 in which the unit waveforms are combined is repeated. During the second control of the first discharge lamp driving of this embodiment, a cycle C2 in which the unit waveforms are combined is repeated.

During the third control of the second discharge lamp driving of this embodiment, a cycle C3 in which the unit waveforms are combined is repeated. During the fourth control of the second discharge lamp driving of this embodiment, a cycle C4 in which the unit waveforms are combined is repeated.

During the fifth control of the third discharge lamp driving of this embodiment, a cycle C5 in which the unit waveforms are combined is repeated. During the sixth control of the third discharge lamp driving of this embodiment, a cycle C6 in which the unit waveforms are combined is repeated.

During the seventh control of the fourth discharge lamp driving of this embodiment, a cycle C7 in which the unit waveforms are combined is repeated. During the eighth control of the fourth discharge lamp driving of this embodiment, a cycle C8 in which the unit waveforms are combined is repeated.

In the cycles C1 to C8 of this embodiment, the unit waveforms DWa1, DWb1, DWc1, DWa2, DWb2, and DWc2 are arranged in this order. Each of the unit waveforms is provided once or a plurality of times in one of the cycles C1 to C8.

An example of the cycle C1 of the first control and the cycle C2 of the second control during the first discharge lamp driving is shown in Table 1.

An example of the cycle C3 of the third control and the cycle C4 of the fourth control during the second discharge lamp driving is shown in Table 2.

An example of the cycle C5 of the fifth control and the cycle C6 of the sixth control during the third discharge lamp driving is shown in Table 3.

An example of the cycle C7 of the seventh control and the cycle C8 of the eighth control during the fourth discharge lamp driving is shown in Table 4.

TABLE 1

| | First discharge lamp driving | | | | | |
|---|---|---|---|---|---|---|
| | DWa1 | DWb1 | DWc1 | DWa2 | DWb2 | DWc2 |
| | Cycle 1 | | | | | |
| First control | 1 | 1 | 1000 | 1 | 1 | 1000 |
| | Cycle 2 | | | | | |
| Second control | 4 | 12 | 1 | 4 | 12 | 1 |

TABLE 2

| | Second discharge lamp driving | | | | | |
|---|---|---|---|---|---|---|
| | DWa1 | DWb1 | DWc1 | DWa2 | DWb2 | DWc2 |
| | Cycle 3 | | | | | |
| Third control | 1 | 1000 | 1 | 1 | 1000 | 1 |
| | Cycle 4 | | | | | |
| Fourth control | 8 | 12 | 1 | 8 | 12 | 1 |

TABLE 3

Third discharge lamp driving

| | DWa1 | DWb1 | DWc1 | DWa2 | DWb2 | DWc2 |
|---|---|---|---|---|---|---|
| Cycle 5 | | | | | | |
| Fifth control | 1 | 1000 | 1 | 1 | 1000 | 1 |
| Cycle 6 | | | | | | |
| Sixth control | 12 | 12 | 1 | 12 | 12 | 1 |

TABLE 4

Fourth discharge lamp driving

| | DWa1 | DWb1 | DWc1 | DWa2 | DWb2 | DWc2 |
|---|---|---|---|---|---|---|
| Cycle 7 | | | | | | |
| Seventh control | 1 | 1000 | 1 | 1 | 1000 | 1 |
| Cycle 8 | | | | | | |
| Eighth control | 16 | 12 | 1 | 16 | 12 | 1 |

In the example of Table 1, in the cycle C1, the unit waveform DWa1 provided one time, the unit waveform DWb1 provided one time, the unit waveform DWc1 continuously provided 1000 times, the unit waveform. DWa2 provided one time, the unit waveform DWb2 provided one time, and the unit waveform DWc2 provided continuously 1000 times are included in this order.

In the cycle C2, the unit waveform DWa1 continuously provided four times, the unit waveform DWb1 continuously provided 12 times, the unit waveform DWc1 provided one time, the unit waveform DWa2 continuously provided four times, the unit waveform DWb2 continuously provided 12 times, and the unit waveform DWc2 provided one time are included in this order.

In Tables 2 to 4, the cycles C3 to C8 are shown in the same manner.

As illustrated in Table 1, the ratio of the unit waveforms DWa1 and DWa2 in the cycle C2 of the second control is higher than the ratio of the unit waveforms DWa1 and DWa2 in the cycle C1 of the first control. In other words, the ratio of the DC currents, that is, the DC durations PH11 and PH12 during the second control is higher than the ratio of the DC currents, that is, the DC durations PH11 and PH12 during the first control.

As illustrated in Table 2, the ratio of the unit waveforms DWa1 and DWa2 in the cycle C4 of the fourth control is higher than the ratio of the unit waveforms DWa1 and DWa2 in the cycle C3 of the third control. In other words, the ratio of the DC currents, that is, the DC durations PH11 and PH12 during the fourth control is higher than the ratio of the DC currents, that is, the DC durations PH11 and PH12 during the third control.

As illustrated in Table 3, the ratio of the unit waveforms DWa1 and DWa2 in the cycle C6 of the sixth control is higher than the ratio of the unit waveforms DWa1 and DWa2 in the cycle C5 of the fifth control. In other words, the ratio of the DC currents, that is, the DC durations PH11 and PH12 during the sixth control is higher than the ratio of the DC currents, that is, the DC durations PH11 and PH12 during the fifth control.

As illustrated in Table 4, the ratio of the unit waveforms DWa1 and DWa2 in the cycle C8 of the eighth control is higher than the ratio of the unit waveforms DWa1 and DWa2 in the cycle C7 of the seventh control. In other words, the ratio of the DC currents, that is, the DC durations PH11 and PH12 during the eighth control is higher than the ratio of the DC currents, that is, the DC durations PH11 and PH12 during the seventh control.

In addition, as shown in Tables 1 to 4, when the second control, the fourth control, the sixth control, and the eighth control are compared to each other, the ratios of the DC currents are increased in this order.

In addition, in this specification, the ratio of the DC current during each control is the ratio of a time for which the DC current is supplied to the discharge lamp 90 to the execution time for which each control is performed. In the examples of Tables 1 to 4, for example, the ratio of the DC current during each control is substantially the same as the ratio of the total number of the unit waveforms DWa1 and DWa2 to the total number of the entirety of the unit waveforms included in a single cycle.

In this specification, if not particularly specified, the ratio of unit waveforms means the ratio of the total number of unit waveforms as an object to the total number of the entirety of unit waveforms included in a single cycle.

In this embodiment, for example, the ratio of the unit waveforms DWb1 and DWb2 and the ratio of the unit waveforms DWc1 and DWc2 during the first control, the third control, the fifth control, and the seventh control are adjusted on the basis of the value of each threshold voltage. That is, the control unit 40 adjusts the ratio of the first AC current and the ratio of the second AC current on the basis of the value of the first threshold voltage V1a11 during the first control. The control unit 40 adjusts the ratio of the first AC current and the ratio of the second AC current on the basis of the value of the second threshold voltage V1a21 during the third control. The control unit 40 adjusts the ratio of the first AC current and the ratio of the second AC current on the basis of the value of the third threshold voltage V1a31 during the fifth control. The control unit 40 adjusts the ratio of the first AC current and the ratio of the second AC current on the basis of the value of the fourth threshold voltage V1a41 during the seventh control.

Specifically, during each control, in a case where a threshold voltage is equal to or lower than a predetermined value, the control unit 40 allows the ratio of the second AC current to be higher than the ratio of the first AC current, and in a case where the threshold voltage is higher than the predetermined value, the control unit 40 allows the ratio of the first AC current to be higher than the ratio of the second AC current. For example, the predetermined value is a value of +5 V with respect to the initial lamp voltage V1a.

In the examples shown in Tables 1 to 4, for example, a case where the first threshold voltage V1a11 is equal to or lower than the predetermined value, and the second threshold voltage V1a21, the third threshold voltage V1a31, and the fourth threshold voltage V1a41 are higher than the predetermined value is shown. Therefore, during the first control shown in Table 1, the ratio of the second AC current, that is, the ratio of the unit waveforms DWc1 and DWc2 is higher than the ratio of the first AC current, that is, the ratio of the unit waveforms DWb1 and DWb2.

On the other hand, during the second control, the third control, and the fourth control shown in Tables 2 to 4, the ratio of the first AC current, that is, the ratio of the unit waveforms DWb1 and DWb2 is higher than the ratio of the second AC current, that is, the ratio of the unit waveforms DWc1 and DWc2.

In the examples of Tables 2 to 4, for example, the cycle C3 of the third control, the cycle C5 of the fifth control, and the cycle C7 of the seventh control are the same.

Next, a method of selecting discharge lamp driving when the discharge lamp 90 is turned on will be described.

Figure 12:
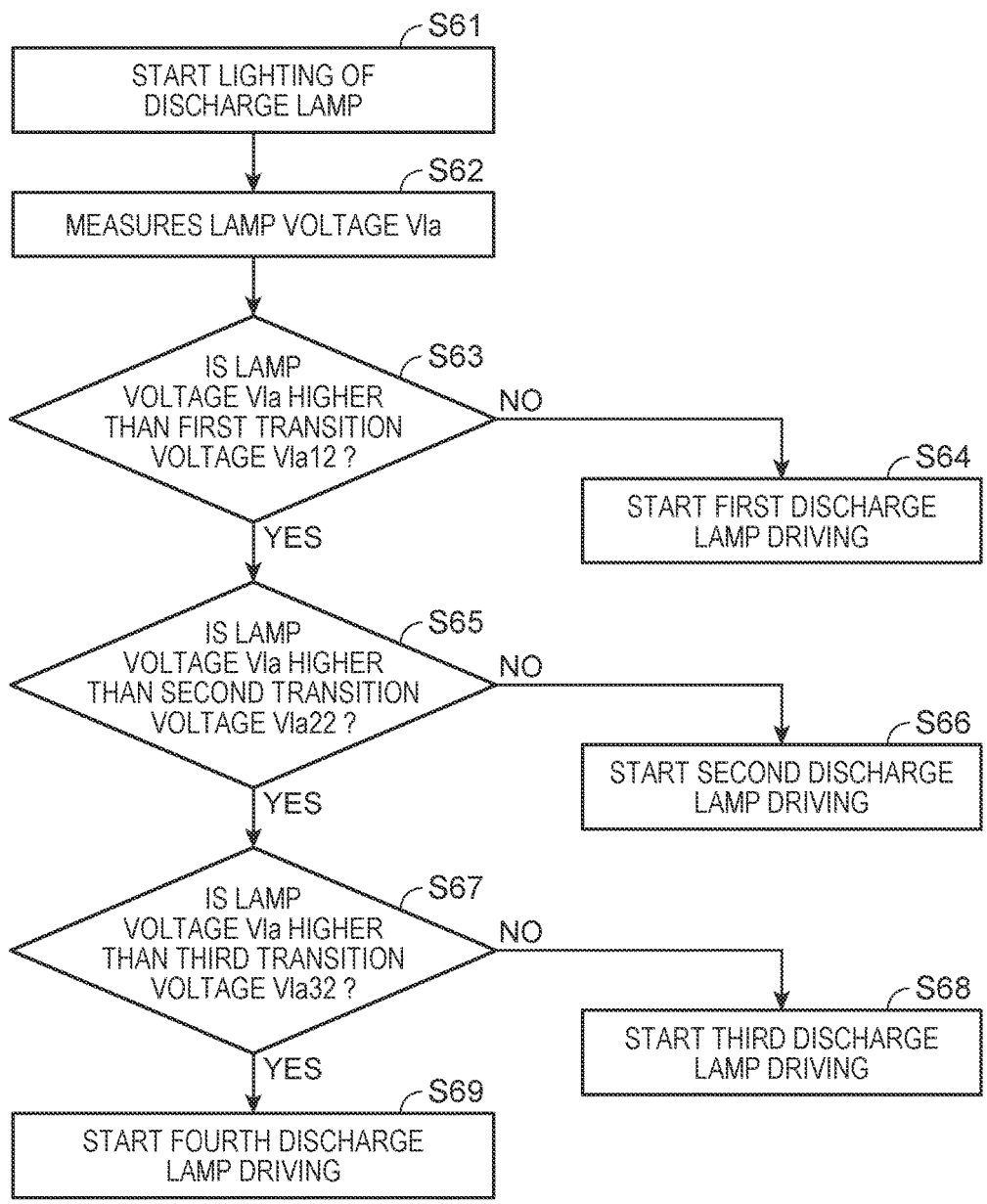

FIG. 12 is a flowchart illustrating an example of the method of selecting discharge lamp driving when the discharge lamp 90 is turned on.

As illustrated in FIG. 12, after the lighting of the discharge lamp 90 is started (Step S61), the control unit 40 measures the lamp voltage V1a using the voltage detection unit of the operation detection unit 60 (Step S62). In addition, the control unit 40 determines whether or not the lamp voltage V1a is higher than the first transition voltage V1a12 (Step S63). In a case where the lamp voltage V1a is equal to or lower than the first transition voltage V1a12 (No in Step S63), the control unit 40 starts the first discharge lamp driving (Step S64).

In a case where the lamp voltage V1a is higher than the first transition voltage V1a12 (Yes in Step S63), the control unit 40 determines whether or not the lamp voltage V1a is higher than the second transition voltage V1a22 (Step S65). In a case where the lamp voltage V1a is equal to or lower than the second transition voltage V1a22 (No in Step S65), the control unit 40 starts the second discharge lamp driving (Step S46).

In a case where the lamp voltage V1a is higher than the second transition voltage V1a22 (Yes in Step S65), the control unit 40 determines whether or not the lamp voltage V1a is higher than the third transition voltage V1a32 (Step S67). In a case where the lamp voltage V1a is equal to or lower than the third transition voltage V1a32 (No in Step S67), the control unit 40 starts the third discharge lamp driving (Step S68). In a case where the lamp voltage V1a is higher than the third transition voltage V1a32 (Yes in Step S67), the control unit 40 starts the fourth discharge lamp driving (Step S69).

As described above, the control unit 40 in this embodiment selects discharge lamp driving when the discharge lamp 90 is turned on.

The control of the control unit 40 described above will be further described in detail.

An example of the threshold voltages, transition voltages, and reverse transition voltages during each of the first discharge lamp driving to the fourth discharge lamp driving is shown in Table 5.

TABLE 5

| First discharge lamp driving | First threshold voltage Vla11 (V) | 65 |
| --- | --- | --- |
| | First transition voltage Vla12 (V) | 68 |
| Second discharge lamp driving | Second threshold voltage Vla21 (V) | 75 |
| | Second transition voltage Vla22 (V) | 78 |
| | First reverse transition voltage Vla23 (V) | 60 |
| Third discharge lamp driving | Third threshold voltage Vla31 (V) | 85 |
| | Third transition voltage Vla32 (V) | 88 |
| | Second reverse transition voltage Vla33 (V) | 70 |
| Fourth discharge lamp driving | Fourth threshold voltage Vla41 (V) | 95 |
| | Third reverse transition voltage Vla43 (V) | 80 |

In the example of Table 5, the initial lamp voltage V1a is, for example, 63 V. That is, at an initial stage of lighting of the discharge lamp 90, the lamp voltage V1a is equal to or lower than the first transition voltage V1a12 (68 V). Therefore, the control unit 40 performs the first discharge lamp driving. In addition, at the initial stage of lighting of the discharge lamp 90, the lamp voltage V1a is equal to or lower than the first threshold voltage V1a11 (65V). Therefore, during the first discharge lamp driving, the control unit 40 sets the control method of the discharge lamp driving unit 230 to the first control and controls the discharge lamp driving unit 230 under the first control.

When the discharge lamp 90 is driven for a long period of time under the first control, the discharge lamp 90 is deteriorated and thus it becomes difficult to form the protrusion 552p, resulting in an increase in the inter-electrode distance. Accordingly, the lamp voltage V1a is increased. When the lamp voltage V1a becomes higher than the first threshold voltage V1a11 (65 V), the control unit 40 sets the control method of the discharge lamp driving unit 230 to the second control at a predetermined set timing.

Here, the ratio of the DC current during the second control is higher than the ratio of the DC current during the first control. Therefore, the first electrode 92 is easily melted during the second control, and the protrusion 552 is easily formed compared to the first control. Accordingly, the protrusion 552p is grown and the inter-electrode distance is reduced, resulting in a decrease in the lamp voltage V1a. In addition, when the lamp voltage V1a becomes equal to or lower than the first threshold voltage V1a11 (65V), the control unit 40 sets the control method of the discharge lamp driving unit 230 to the first control again at a predetermined set timing.

As the setting of the first control and the setting of the second control are alternately repeated, the lamp voltage V1a is maintained in a constant range with respect to the first threshold voltage V1a11 (65 V) while an increase and a decrease in the lamp voltage V1a with respect to the first threshold voltage V1a11 are repeated.

When the first discharge lamp driving is performed for a long period of time, there may be cases where the lamp voltage V1a is not decreased during the second control as the discharge lamp 90 is deteriorated. In this case, the control unit 40 switches the driving of the discharge lamp 90 from the first discharge lamp driving to the second discharge lamp driving. Specifically, for example, in a case where the lamp voltage V1a is higher than the first transition voltage V1a12 (68 V) and the continuous execution time of the second control is equal to or longer than the first transition time t1, for example, equal to or longer than 20 minutes, the control unit 40 switches the driving of the discharge lamp 90 from the first discharge lamp driving to the second discharge lamp driving.

During the second discharge lamp driving, similar to the first discharge lamp driving, the setting of the third control and the setting of the fourth control are alternately repeated. Accordingly, the lamp voltage V1a is maintained in a constant range with respect to the second threshold voltage V1a21 (75 V) while an increase and a decrease in the lamp voltage V1a with respect to the second threshold voltage V1a21 (75 V) are repeated. In addition, in a case where the lamp voltage V1a is not decreased during the fourth control, for example, in a case where the lamp voltage V1a is higher than the second transition voltage V1a22 (78 V) and the continuous execution time of the fourth control is equal to or longer than the second transition time t2, for example, equal to or longer than 20 minutes, the control unit 40 switches the driving of the discharge lamp 90 from the second discharge lamp driving to the third discharge lamp driving.

On the other hand, during the second discharge lamp driving, for example, there may be cases where the protrusion 552p of the first electrode 92 is grown and the lamp voltage V1*a* is significantly decreased. In this case, the control unit 40 switches the driving of the discharge lamp 90 from the second discharge lamp driving to the first discharge lamp driving. Specifically, for example, in a case where the lamp voltage V1*a* becomes lower than the first reverse transition voltage V1*a*23 (60 V), the control unit 40 switches the driving of the discharge lamp 90 from the second discharge lamp driving to the first discharge lamp driving.

Hereinbelow, the third discharge lamp driving and the fourth discharge lamp driving are performed in the same manner.

The control by the control unit 40 described above can be represented as a discharge lamp driving method. That is, the discharge lamp driving method of this embodiment is a discharge lamp driving method of driving the discharge lamp 90 by supplying the drive current I to the discharge lamp 90, the discharge lamp driving method including: the first discharge lamp driving in which the first control and the second control for supplying the drive current I including the DC current and the AC current to the discharge lamp 90 are performed; and the second discharge lamp driving in which the third control and the fourth control for supplying the drive current I including the DC current and the AC current to the discharge lamp 90 are performed, in which during the first discharge lamp driving, in a case where the lamp voltage V1*a* is equal to or lower than the first threshold voltage V1*a*11 at a predetermined set timing, the first control is performed, and in a case where the lamp voltage V1*a* is higher than the first threshold voltage V1*a*11 at the predetermined set timing, the second control is performed, during the second discharge lamp driving, in a case where the lamp voltage V1*a* is equal to or lower than the second threshold voltage V1*a*21 that is higher than the first threshold voltage V1*a*11, at a predetermined set timing, the third control is performed, and in a case where the lamp voltage V1*a* is higher than the second threshold voltage V1*a*21 at the predetermined set timing, the fourth control is performed, the ratio of the DC current during the second control is higher than the ratio of the DC current during the first control, the ratio of the DC current during the fourth control is higher than the ratio of the DC current during the third control and is higher than the ratio of the DC current during the second control, and during the second discharge lamp driving, in a case where the lamp voltage V1*a* is lower than the first reverse transition voltage V1*a*23 that is lower than the second threshold voltage V1*a*21, a transition from the second discharge lamp driving to the first discharge lamp driving is performed.

According to this embodiment, the control unit 40 can perform the first discharge lamp driving in which the first control, and the second control in which the ratio of the DC current is higher than that of the first control are performed. The control unit 40 controls the discharge lamp driving unit 230 by setting the first control or the second control on the basis of the lamp voltage V1*a*. Therefore, according to this embodiment, the service life of the discharge lamp 90 can be enhanced. Hereinafter, this will be described in detail.

For example, in a case where a drive current waveform in which an AC current having a plurality of frequencies and a DC current are combined is supplied to the discharge lamp 90, in an initial stage, the protrusion 552*p* is formed. However, as the discharge lamp 90 is deteriorated due to long-term use, it gradually becomes difficult to form the protrusion 552*p*, and there may be cases where a stable electrode shape cannot be maintained.

Figure 13A:
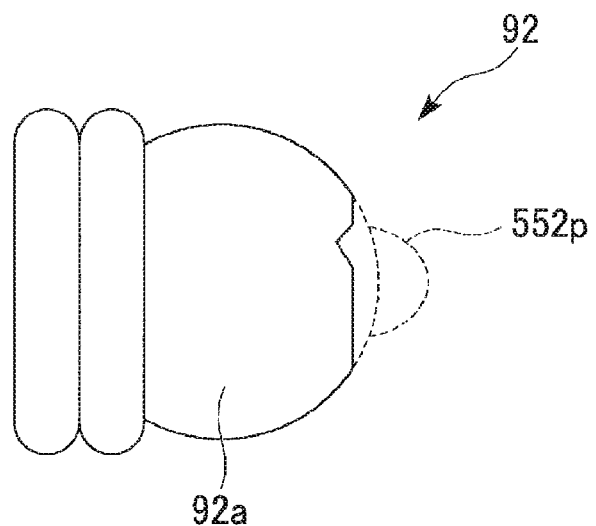
FIGS. 13A and 13B are views illustrating a change in an electrode of the discharge lamp.
Figure 13B:
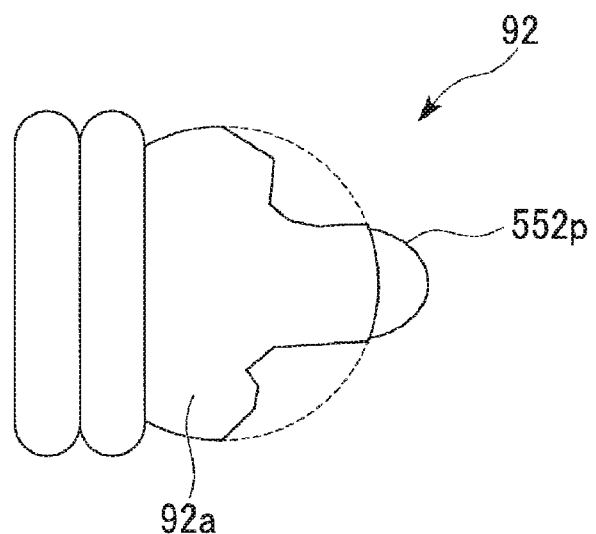
Figure 14A:
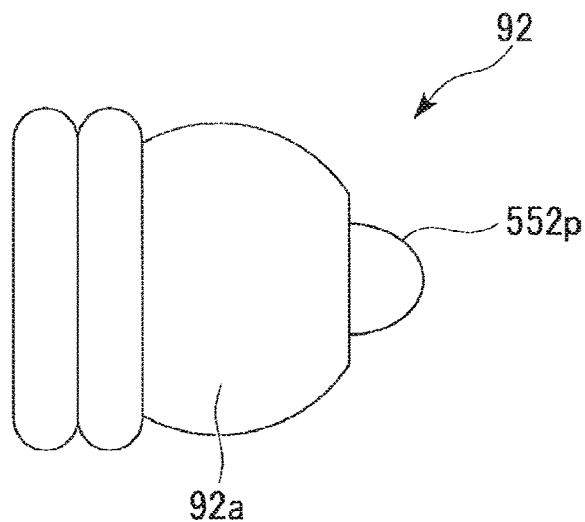
FIGS. 14A to 14C are views illustrating a change in the electrode of the discharge lamp.

FIGS. 13A to 14A are views illustrating a change in the first electrode 92 of the discharge lamp 90. FIG. 13A is a view illustrating the first electrode 92 in a case where the discharge lamp 90 is driven for a long period of time using only the first control. FIG. 13B is a view illustrating the first electrode 92 in a case where the discharge lamp 90 is driven for a long period of time using only the second control. FIG. 14A is a view illustrating a case where the discharge lamp 90 is driven for a long period of time by appropriately setting the first control and the second control as described above, that is, the discharge lamp 90 is driven for a long period of time using the first discharge lamp driving.

As illustrated in FIG. 13A, for example, when the discharge lamp driving unit 230 is continuously controlled for a long period of time using the first control, the protrusion 552*p* of the first electrode 92 is destroyed, and the tip end of the electrode body 92*a* is formed in a flat shape.

On the other hand, since the ratio of the DC current is higher during the second control than that during the first control, the first electrode 92 is easily melted, and the protrusion 552*p* is easily grown compared to the first control. However, as illustrated in FIG. 13B, when the discharge lamp driving unit 230 is continuously controlled for a long period of time using the second control, although the protrusion 552*p* of the first electrode 92 is formed, the electrode body 92*a* is consumed and becomes thinner.

As described above, when only a single control method, for example, any control method of the first control and the second control is used, the discharge lamp 90 is driven for a long period of time and is deteriorated, and thus the shape of the first electrode 92 becomes unstable. As a result, there may be cases where the service life of the discharge lamp 90 cannot be sufficiently enhanced.

Contrary to this, according to the embodiment, the first control and the second control are appropriately set according to whether or not the lamp voltage V1*a* is equal to or lower than the first threshold voltage V1*a*11, and the first control and the second control are alternately repeated. Therefore, in this embodiment, as illustrated in FIG. 14A, by the second control, the protrusion 552*p* is formed on the tip end of the electrode body 92*a* which is flattened by the first control. Accordingly, according to this embodiment, even in a case of long-term driving, the shape of the first electrode 92 can be stably maintained.

As described above, according to this embodiment, the shape of the protrusion 552*p* of the first electrode 92 can be stably maintained. Therefore, the lamp voltage V1*a* can be maintained in a constant range with respect to the first threshold voltage V1*a*11 for a long period of time as described above. As a result, according to this embodiment, the service life of the discharge lamp 90 can be enhanced.

In addition, according to this embodiment, the control unit 40 can perform the first discharge lamp driving and the second discharge lamp driving, and when predetermined conditions are satisfied, transitions the driving of the discharge lamp 90 from the first discharge lamp driving to the second discharge lamp driving. Therefore, the service life of the discharge lamp 90 can be further enhanced. Hereinafter, this will be described in detail.

Figure 14B:
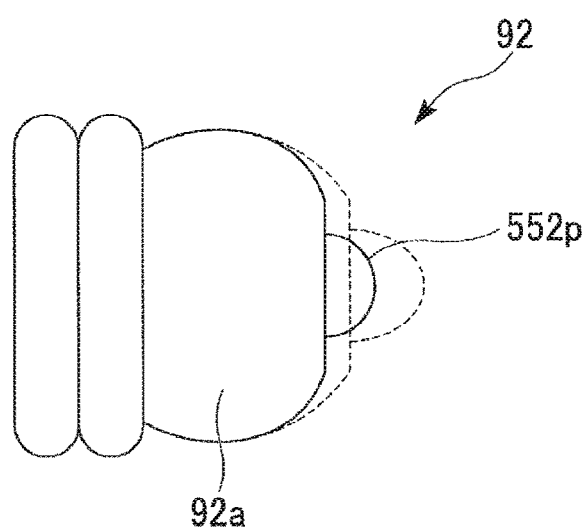

FIG. 14B is a view illustrating a case where the discharge lamp 90 is driven for a long period of time from the state of FIG. 14A, using the first discharge lamp driving. Broken lines in FIG. 14B indicate the shape of the first electrode 92 in FIG. 14A.

As illustrated in FIG. 14B, in a case where the first discharge lamp driving is performed for a further longer period of time, the entirety of the first electrode 92 wears down, and there may be cases where the first electrode 92 is shortened. In this case, the lamp voltage V1*a* of the discharge lamp 90 is increased, and the lamp voltage V1a is not decreased to the first threshold voltage V1a11 or lower even when the second control is performed. Therefore, only the second control is continuously performed without the setting of the first control. When this state continues for a long period of time, the second control is performed for a long period of time, and similar to the shape illustrated in FIG. 13B, the electrode body 92a of the first electrode 92 wears down and is thinned. Therefore, there may be cases where the service life of the discharge lamp 90 cannot be sufficiently enhanced only by the first discharge lamp driving.

Contrary to this, according to this embodiment, during the second control of the first discharge lamp driving, in a case where the lamp voltage V1a is higher than the first transition voltage V1a12 and the continuous execution time of the second control is equal to or longer than the first transition time t1, the control unit 40 switches the driving of the discharge lamp 90 from the first discharge lamp driving to the second discharge lamp driving. The ratio of the DC current during the fourth control of the second discharge lamp driving is higher than the ratio of the DC current during the second control of the first discharge lamp driving. Therefore, even in a case where the lamp voltage V1a cannot be decreased by the second control, the lamp voltage V1a can be decreased by using the fourth control. Accordingly, during the second discharge lamp driving, by alternately repeating the third control and the fourth control, the lamp voltage V1a can be maintained in a constant range with respect to the second threshold voltage V1a21 for a long period of time while maintaining the shape of the first electrode 92 in a stable shape.

As described above, according to this embodiment, the service life of the discharge lamp 90 can be further enhanced.

In addition, according to this embodiment, during the second discharge lamp driving, in a case where predetermined conditions are satisfied, the control unit 40 transitions the driving of the discharge lamp 90 from the second discharge lamp driving to the first discharge lamp driving. Therefore, the service life of the discharge lamp 90 can be further enhanced. Hereinafter, this will be described in detail.

Figure 14C:
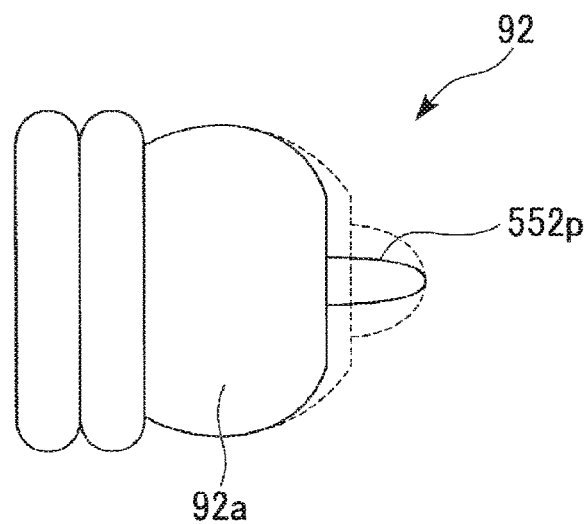

FIG. 14C is a view illustrating an example of a case where the discharge lamp 90 is driven for a long period of time from the state of FIG. 14B, using the second discharge lamp driving. Broken lines in FIG. 14C indicate the shape of the first electrode 92 in FIG. 14A.

As illustrated in FIG. 14C, in a case where the second discharge lamp driving is performed for a long period of time, the protrusion 552p is grown, and for example, there may be cases where the protrusion length of the protrusion 552p becomes equal to or greater than the protrusion length of the protrusion 552p when the first discharge lamp driving illustrated in FIG. 14A is performed. Particularly, during the third control of the second discharge lamp driving, in a case where the ratio of a high-frequency AC current included in the drive current I is high, the protrusion 552p is easily grown. The protrusion 552p that is grown due to the high-frequency AC current is easily thinned as illustrated in FIG. 14C. For example, in the example shown in Table 2, since the ratio of the first AC current having the first frequency that is higher than the second frequency is high during the third control, in a case where the second discharge lamp driving is performed for a long period of time, the protrusion 552p is likely to have the shape illustrated in FIG. 14C during the third control.

In this case, when the drive current I having a high thermal load is supplied to the discharge lamp 90, the protrusion 552p is likely to rapidly wear down. Therefore, for example, there may be cases where the protrusion 552p is abruptly destroyed, and the lamp voltage V1a is rapidly increased. Accordingly, there may be cases where the service life of the discharge lamp 90 cannot be sufficiently enhanced.

Contrary to this, according to this embodiment, in a case where the lamp voltage V1a is lower than the first reverse transition voltage V1a23, the driving of the discharge lamp 90 is transitioned from the second discharge lamp driving to the first discharge lamp driving. The ratio of the DC current during the second control of the first discharge lamp driving is lower than the ratio of the DC current during the fourth control of the second discharge lamp driving. Therefore, during the first discharge lamp driving, the thermal load applied to the first electrode 92 is lower than that during the second discharge lamp driving. Accordingly, the protrusion 552p of the first electrode 92 which is thinly grown during the second discharge lamp driving can be prevented from rapidly wearing down. Therefore, according to this embodiment, the service life of the discharge lamp 90 can be further enhanced.

For example, in a case where drive power supplied to the discharge lamp 90 varies, such as a 3D projector, the discharge lamp 90 is particularly easily deteriorated. Therefore, in the case where drive power supplied to the discharge lamp 90 varies, the effects of this embodiment become significant.

In addition, for example, in a case where the first reverse transition voltage V1a23 is higher than the first threshold voltage V1a11, a transition to the first discharge lamp driving may be performed in a state in which the protrusion 552p is insufficiently grown. In this case, there may be cases where the lamp voltage V1a is not decreased by the first discharge lamp driving, and the driving is immediately returned to the second discharge lamp driving. Therefore, there may be cases discharge lamp driving cannot be appropriately switched, and the service life of the discharge lamp 90 cannot be sufficiently enhanced.

Contrary to this, according to this embodiment, the first reverse transition voltage V1a23 is lower than the first threshold voltage V1a11. Accordingly, when the protrusion 552p of the first electrode 92 is sufficiently grown during the second discharge lamp driving, the driving of the discharge lamp 90 can be transitioned to the first discharge lamp driving. Therefore, according to this embodiment, a transition of the discharge lamp driving can be appropriately performed, and thus the service life of the discharge lamp 90 can be further enhanced.

In addition, according to this embodiment, the ratio of the DC current during the third control is substantially equal to the ratio of the DC current during the first control. Therefore, the difference in the ratio of the DC current between the third control and the fourth control is greater than the difference in the ratio of the DC current between the first control and the second control. Accordingly, a drop in thermal load applied to the discharge lamp 90 can be further increased during the second discharge lamp driving than during the first discharge lamp driving, and thus the protrusion 552p of the first electrode 92 can be easily grown. Therefore, when the deterioration of the discharge lamp 90 proceeds to a certain degree and it becomes difficult to grow the protrusion 552p of the first electrode 92, the protrusion 552p of the first electrode 92 can be easily grown by the fourth control of the second discharge lamp driving. As a result, according to this embodiment, the service life of the discharge lamp 90 can be further enhanced.

In addition, according to this embodiment, the first transition voltage V1$a$12 is higher than the first threshold voltage V1$a$11. Therefore, in a case where the value of the lamp voltage V1$a$1 is increased by a certain degree and the deterioration of the discharge lamp 90 proceeds to a certain degree, the driving of the discharge lamp 90 can be transitioned from the first discharge lamp driving to the second discharge lamp driving. That is, the driving of the discharge lamp 90 can be more appropriately switched depending on the deteriorated state of the discharge lamp 90. Therefore, according to this embodiment, the service life of the discharge lamp 90 can be further enhanced.

In addition, according to this embodiment, the first transition voltage V1$a$12 is lower than the second threshold voltage V1$a$21. Therefore, during the first discharge lamp driving, before the deterioration of the discharge lamp 90 proceeds excessively, the driving of the discharge lamp 90 can be transitioned to the second discharge lamp driving. Accordingly, according to this embodiment, the driving of the discharge lamp 90 can be more appropriately switched, and thus the service life of the discharge lamp 90 can be further enhanced.

In addition, according to this embodiment, the predetermined set timings at which the first control and the second control are set are provided every predetermined time. Therefore, for example, even in a case where the lamp voltage V1$a$ becomes equal to or lower than the first threshold voltage V1$a$11 immediately after switching from the first control to the second control, the discharge lamp 90 is driven under the second control until a predetermined time elapses after the switching to the second control. Accordingly, the first control and the second control can be alternately performed for certain periods of times, and thus the shape of the first electrode 92 can be maintained in a stable shape. Therefore, according to this embodiment, the service life of the discharge lamp 90 can be further enhanced.

In addition, as described above, by alternately repeating the first control and the second control, the lamp voltage V1$a$ can be maintained in a constant range with respect to the first threshold voltage V1$a$11. Therefore, in a case where the first threshold voltage V1$a$11 is relatively low, the lamp voltage V1$a$ that is maintained is relatively reduced. That is, the first electrode 92 of the discharge lamp 90 is maintained in a state in which the deterioration degree thereof is relatively low. In this case, there is concern that the protrusion 552$p$ may be excessively grown during the first control, and thus there is concern that the first electrode 92 of the discharge lamp 90 may not be stably maintained.

On the other hand, in a case where the first threshold voltage V1$a$11 is relatively high, the lamp voltage V1$a$ that is maintained is relatively increased. That is, the first electrode 92 of the discharge lamp 90 is maintained in a state in which the deterioration degree thereof is relatively high. In this case, there is concern that the deterioration of the first electrode 92 may easily proceed and the first electrode 92 may excessively wear down.

Contrary to this, according to this embodiment, the control unit 40 adjusts the ratio of the first AC current and the ratio of the second AC current on the basis of the value of the first threshold voltage V1$a$11 during the first control. Therefore, the ratio of the first AC current and the ratio of the second AC current can be appropriately adjusted to stably maintain the first electrode 92 depending on the magnitude of the first threshold voltage V1$a$11.

Specifically, according to this embodiment, during the first control, in a case where the first threshold voltage V1$a$11 is equal to or lower than a predetermined value, the control unit 40 allows the ratio of the second AC current to be higher than the ratio of the first AC current, and in a case where the first threshold voltage V1$a$11 is higher than the predetermined value, the control unit 40 allows the ratio of the first AC current to be higher than the ratio of the second AC current.

Here, the AC current having a low frequency has a high thermal load applied to the first electrode 92 and easily allows the protrusion 552$p$ to be in a melted state. Therefore, in a case where the first threshold voltage V1$a$11 is relatively low, that is, equal to or lower than the predetermined value, by increasing the ratio of the second AC current having the second frequency that is lower than the first frequency of the first AC current, the protrusion 552$p$ can be prevented from being excessively grown.

On the other hand, in a case where the first threshold voltage V1$a$11 is relatively high, that is, equal to or higher than the predetermined value, by increasing the ratio of the first AC current having the first frequency that is higher than the second frequency of the second AC current, the protrusion 552$p$ can be prevented from excessively wearing down.

As described above, according to this embodiment, the first electrode 92 can be more stably maintained. This effect can be more significantly obtained in a case where the first frequency is set to 500 Hz or higher and the second frequency is set to 280 Hz or lower.

In addition, as described above, the example shown in Table 1 shows a case where the first threshold voltage V1$a$11 is equal to or lower than a predetermined value.

In this embodiment, the following configurations and methods may also be employed.

In the above description, a configuration in which, in a case where a reverse transition from the discharge lamp driving that is performed needs to be performed, a transition to a stage immediately prior to the discharge lamp driving that is performed is made. However, this embodiment is not limited thereto. In this embodiment, a configuration in which the lamp voltage V1$a$ is compared to each reverse transition voltage during each discharge lamp driving and a reverse transition to appropriate discharge lamp driving may be performed may be employed.

In this configuration, specifically, for example, the control unit 40 compares the lamp voltage V1$a$ to the first reverse transition voltage V1$a$23 and the second reverse transition voltage V1$a$33 while performing the third discharge lamp driving. In addition, in a case where the lamp voltage V1$a$ is lower than the second reverse transition voltage V1$a$33 and is equal to or higher than the first reverse transition voltage V1$a$23 during the third discharge lamp driving, the control unit 40 transitions the driving of the discharge lamp 90 from the third discharge lamp driving to the second discharge lamp driving. In a case where the lamp voltage V1$a$ is lower than the first reverse transition voltage V1$a$23 during the third discharge lamp driving, the control unit 40 transitions the driving of the discharge lamp 90 from the third discharge lamp driving to the first discharge lamp driving. According to this configuration, appropriate discharge lamp driving can be performed depending on the lamp voltage V1$a$, and thus the service life of the discharge lamp 90 can be further enhanced.

In addition, in this embodiment, a predetermined set timing at which the control method is set may be provided once whenever the projector 500 is powered on. In this case, in a single period until the projector 500 is powered off after the projector 500 is powered on, the discharge lamp driving unit 230 is controlled under only one control of the first control and the second control.

In the above description, the control unit 40 allows four drivings from the first discharge lamp driving to the fourth discharge lamp driving to be performed as the driving of the discharge lamp 90, but is not limited thereto. In this embodiment, for example, the control unit 40 may also allow only two or three drivings to be performed as the driving of the discharge lamp 90 or may also allow five or more drivings to be performed. For example, as the number of discharge lamp drivings that can be performed is increased, it becomes easy to appropriately change the driving of the discharge lamp 90 depending on the deterioration of the discharge lamp 90, and thus the service life of the discharge lamp 90 can be easily enhanced.

In this embodiment, for example, a configuration in which the discharge lamp driving that is performed is stored when the discharge lamp 90 is turned off and the stored discharge lamp driving is performed when the discharge lamp 90 is turned on again may be employed.

In the above description, it is determined whether or not to transition each discharge lamp driving at a predetermined set timing. However, this embodiment is not limited thereto. In this embodiment, whether or not to transition the discharge lamp driving may be determined by always monitoring the lamp voltage V1$a$. In this case, for example, there may be cases where a transition to the second discharge lamp driving may be performed before a predetermined time elapses after the first control is set.

In this embodiment, the first threshold voltage V1$a$11 and the first transition voltage V1$a$12 may have the same value. In this case, the lamp voltage V1$a$ becomes higher than the first threshold voltage V1$a$11, and at a point of time when the second control is set, the lamp voltage V1$a$ becomes higher than the first transition voltage V1$a$12. Therefore, in this case, when the continuous execution time of the second control becomes equal to or longer than the first transition time t1, the control unit 40 transitions the driving of the discharge lamp 90 from the first discharge lamp driving to the second discharge lamp driving.

In the above description, a configuration in which the drive current waveforms during the first control and the second control include a DC current and two types of AC currents having different frequencies is employed. However, this embodiment is not limited thereto. In this embodiment, only one type of AC current may be included in the drive current waveforms during the first control and the second control, or three or more types of AC currents having different frequencies may also be included. In addition, in this embodiment, two or more types of DC currents may be included in the drive current waveforms during the first control and the second control. Two or more types of DC currents may include two or more types of DC currents in which the absolute values of current values supplied to the discharge lamp 90 are different from each other.

In the above-described embodiment, an example of a case where the invention is applied to a transmissive projector is described. However, the invention may also be applied to a reflective projector. Here, "transmissive" means a type in which light is transmitted by the liquid crystal light valve including the liquid crystal panel and the like. "Reflective" means a type in which light is reflected by the liquid crystal light valve. In addition, a light modulation device is not limited to the liquid crystal panel or the like, and for example, may also be a light modulation device using a micromirror.

In the above-described embodiment, an example of the projector 500 which uses the three liquid crystal panels 560R, 560G, and 560B (the liquid crystal light valves 330R, 330G, and 330B) is employed. However, the invention may also be applied to a projector which uses only a single liquid crystal panel or a projector which uses four or more liquid crystal panels.

In addition, the configurations described above can be appropriately combined in a range in which there is no contradiction therebetween.

The entire disclosure of Japanese Patent Application No. 2015-045580, filed Mar. 9, 2015 is expressly incorporated by reference herein.

What is claimed is:

1. A discharge lamp driving device comprising:
    a discharge lamp driving unit configured to supply a drive current to a discharge lamp;
    a control unit configured to control the discharge lamp driving unit; and
    a voltage detection unit configured to detect an inter-electrode voltage of the discharge lamp,
    wherein the control unit performs
        a first discharge lamp driving in which a first control and a second control for supplying the drive current including a DC current and an AC current to the discharge lamp are performed, and
        a second discharge lamp driving in which a third control and a fourth control for supplying the drive current including the DC current and the AC current to the discharge lamp are performed,
    in the first discharge lamp driving, the control unit performs the first control in a case where the inter-electrode voltage is equal to or lower than a first threshold voltage at a predetermined set timing, and performs the second control in a case where the inter-electrode voltage is higher than the first threshold voltage at the predetermined set timing,
    in the second discharge lamp driving, the control unit performs the third control in a case where the inter-electrode voltage is equal to or lower than a second threshold voltage that is higher than the first threshold voltage at a predetermined set timing, and performs the fourth control in a case where the inter-electrode voltage is higher than the second threshold voltage at the predetermined set timing,
    a ratio of the DC current in the second control is higher than a ratio of the DC current in the first control,
    a ratio of the DC current in the fourth control is higher than a ratio of the DC current in the third control and is higher than the ratio of the DC current in the second control, and
    in the second discharge lamp driving, the control unit performs a transition from the second discharge lamp driving to the first discharge lamp driving in a case where the inter-electrode voltage is lower than a first reverse transition voltage that is lower than the second threshold voltage.

2. The discharge lamp driving device according to claim 1,
    wherein a total length of DC duration for which the DC current is supplied in the second control is larger than a total length of DC duration for which the DC current is supplied in the first control, and
    a total length of DC duration for which the DC current is supplied in the fourth control is larger than a total length of DC duration for which the DC current is supplied in the third control and is larger than a total length of DC duration for which the DC current is supplied in the second control.

3. The discharge lamp driving device according to claim 1,
wherein the first reverse transition voltage is lower than the first threshold voltage.

4. The discharge lamp driving device according to claim 1,
wherein the ratio of the DC current in the third control is substantially equal to the ratio of the DC current in the first control.

5. The discharge lamp driving device according to claim 1,
wherein, in the second control of the first discharge lamp driving, in a case where the inter-electrode voltage is higher than a first transition voltage that is equal to or higher than the first threshold voltage and a continuous execution time of the second control is equal to or longer than a first transition time, the control unit performs a transition from the first discharge lamp driving to the second discharge lamp driving.

6. The discharge lamp driving device according to claim 5,
wherein the first transition voltage is higher than the first threshold voltage.

7. The discharge lamp driving device according to claim 5,
wherein the first transition voltage is lower than the second threshold voltage.

8. The discharge lamp driving device according to claim 1,
wherein the control unit performs a third discharge lamp driving in which a fifth control and a sixth control for supplying the drive current including the DC current and the AC current to the discharge lamp are performed,
in the third discharge lamp driving, the control unit performs the fifth control in a case where the inter-electrode voltage is equal to or lower than a third threshold voltage that is higher than the second threshold voltage at a predetermined set timing, and performs the sixth control in a case where the inter-electrode voltage is higher than the third threshold voltage at the predetermined set timing,
a ratio of the DC current in the sixth control is higher than a ratio of the DC current in the fifth control and is higher than the ratio of the DC current in the fourth control, and
in the fourth control of the second discharge lamp driving, in a case where the inter-electrode voltage is higher than a second transition voltage that is equal to or higher than the third threshold voltage and a continuous execution time of the fourth control is equal to or longer than a second transition time, the control unit performs a transition from the second discharge lamp driving to the third discharge lamp driving.

9. The discharge lamp driving device according to claim 8,
wherein a total length of DC duration for which the DC current is supplied in the sixth control is larger than a total length of DC duration for which the DC current is supplied in the fifth control and is larger than a total length of DC duration for which the DC current is supplied in the fourth control.

10. The discharge lamp driving device according to claim 8,
wherein, in the third discharge lamp driving, the control unit
performs a transition from the third discharge lamp driving to the second discharge lamp driving in a case where the inter-electrode voltage is lower than a second reverse transition voltage that is lower than the third threshold voltage and is equal to or higher than the first reverse transition voltage, and
performs a transition from the third discharge lamp driving to the first discharge lamp driving in a case where the inter-electrode voltage is lower than the first reverse transition voltage.

11. A projector comprising:
a discharge lamp configured to emit light;
the discharge lamp driving device according to claim 1;
a light modulation element configured to modulate light emitted from the discharge lamp according to a video signal; and
a projection optical system configured to project the light modulated by the light modulation element.

12. A projector comprising:
a discharge lamp configured to emit light;
the discharge lamp driving device according to claim 2;
a light modulation element configured to modulate light emitted from the discharge lamp according to a video signal; and
a projection optical system configured to project the light modulated by the light modulation element.

13. A projector comprising:
a discharge lamp configured to emit light;
the discharge lamp driving device according to claim 3;
a light modulation element configured to modulate light emitted from the discharge lamp according to a video signal; and
a projection optical system configured to project the light modulated by the light modulation element.

14. A projector comprising:
a discharge lamp configured to emit light;
the discharge lamp driving device according to claim 4;
a light modulation element configured to modulate light emitted from the discharge lamp according to a video signal; and
a projection optical system configured to project the light modulated by the light modulation element.

15. A projector comprising:
a discharge lamp configured to emit light;
the discharge lamp driving device according to claim 5;
a light modulation element configured to modulate light emitted from the discharge lamp according to a video signal; and
a projection optical system configured to project the light modulated by the light modulation element.

16. A projector comprising:
a discharge lamp configured to emit light;
the discharge lamp driving device according to claim 6;
a light modulation element configured to modulate light emitted from the discharge lamp according to a video signal; and
a projection optical system configured to project the light modulated by the light modulation element.

17. A projector comprising:
a discharge lamp configured to emit light;
the discharge lamp driving device according to claim 7;
a light modulation element configured to modulate light emitted from the discharge lamp according to a video signal; and a projection optical system configured to project the light modulated by the light modulation element.

18. A projector comprising:
a discharge lamp configured to emit light;
the discharge lamp driving device according to claim 8;
a light modulation element configured to modulate light emitted from the discharge lamp according to a video signal; and
a projection optical system configured to project the light modulated by the light modulation element.

19. A projector comprising:
a discharge lamp configured to emit light;
the discharge lamp driving device according to claim 9;
a light modulation element configured to modulate light emitted from the discharge lamp according to a video signal; and
a projection optical system configured to project the light modulated by the light modulation element.

20. A discharge lamp driving method for driving a discharge lamp to supply a drive current to the discharge lamp, the method comprising:
performing a first discharge lamp driving in which a first control and a second control for supplying the drive current including a DC current and an AC current to the discharge lamp are performed; and
performing a second discharge lamp driving in which a third control and a fourth control for supplying the drive current including the DC current and the AC current to the discharge lamp are performed,
wherein, in the first discharge lamp driving, in a case where an inter-electrode voltage of the discharge lamp is equal to or lower than a first threshold voltage at a predetermined set timing, the first control is performed, and in a case where the inter-electrode voltage is higher than the first threshold voltage at the predetermined set timing, the second control is performed,
in the second discharge lamp driving, in a case where the inter-electrode voltage is equal to or lower than a second threshold voltage that is higher than the first threshold voltage at a predetermined set timing, the third control is performed, and in a case where the inter-electrode voltage is higher than the second threshold voltage at the predetermined set timing, the fourth control is performed,
a ratio of the DC current in the second control is higher than a ratio of the DC current in the first control,
a ratio of the DC current in the fourth control is higher than a ratio of the DC current in the third control and is higher than the ratio of the DC current in the second control, and
in the second discharge lamp driving, in a case where the inter-electrode voltage is lower than a first reverse transition voltage that is lower than the second threshold voltage, a transition from the second discharge lamp driving to the first discharge lamp driving is performed.

* * * * *